US012700290B2

(12) United States Patent
Jain et al.

(10) Patent No.: US 12,700,290 B2
(45) Date of Patent: Aug. 4, 2026

(54) ALERT MANAGEMENT SYSTEM

(71) Applicant: HONEYWELL INTERNATIONAL INC., Charlotte, NC (US)

(72) Inventors: Saumya Jain, Jabalpur (IN); Hardik Agarwal, Siliguri (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/201,819

(22) Filed: May 25, 2023

(65) Prior Publication Data

US 2024/0395118 A1     Nov. 28, 2024

(51) Int. Cl.
| | |
|---|---|
| *G08B 5/22* | (2006.01) |
| *G08B 17/10* | (2006.01) |
| *G10L 15/22* | (2006.01) |

(52) U.S. Cl.
CPC .............. *G08B 5/226* (2013.01); *G08B 17/10* (2013.01); *G10L 15/22* (2013.01)

(58) Field of Classification Search
None
See application file for complete search history.

(56) References Cited

U.S. PATENT DOCUMENTS

| | | | | | |
|---|---|---|---|---|---|
| 6,720,881 | B1 * | 4/2004 | Halliday | .............. | G08B 25/012 340/573.6 |
| 7,733,224 | B2 * | 6/2010 | Tran | ...................... | A61B 5/1116 340/8.1 |

| | | | | | |
|---|---|---|---|---|---|
| 9,584,641 | B2 * | 2/2017 | Mestre | .............. | H04M 1/72412 |
| 9,967,940 | B2 * | 5/2018 | Zampini, II | ........... | H05B 45/18 |
| 10,036,808 | B2 * | 7/2018 | Watkins | .............. | H04L 27/2272 |
| 10,380,875 | B1 * | 8/2019 | Roberts | ...................... | G08B 7/06 |
| 10,422,873 | B2 * | 9/2019 | Watkins | .............. | H04L 27/2272 |
| 10,768,784 | B2 * | 9/2020 | Shearer | .............. | H04L 12/2823 |
| 10,816,939 | B1 * | 10/2020 | Coleman | ................ | G01S 17/86 |
| 10,861,461 | B2 * | 12/2020 | Tak | ......................... | G06F 3/167 |
| 11,388,181 | B2 * | 7/2022 | Nakanelua | .......... | H04L 63/1425 |
| 2006/0291212 | A1 * | 12/2006 | Forsman | .............. | G10H 1/0016 362/276 |
| 2009/0224880 | A1 * | 9/2009 | Smith | .................. | G08B 27/008 381/104 |
| 2014/0306974 | A1 * | 10/2014 | Vandoros | .............. | G09G 3/002 345/522 |
| 2015/0161551 | A1 * | 6/2015 | Warren | ................. | H04W 4/029 705/7.41 |
| 2015/0161738 | A1 * | 6/2015 | Stempora | .............. | G06Q 40/08 705/4 |

(Continued)

*Primary Examiner* — Carlos Garcia
(74) *Attorney, Agent, or Firm* — ALSTON & BIRD LLP

(57) ABSTRACT

Approaches for managing alerts on detecting occurrence of a plurality of events within a premises, are described. According to one example, a control unit and a plurality of alert generating units may be provided. The control unit may receive sensor data generated by a sensing unit. The sensor data may then be processed to ascertain occurrence of an event from among the plurality of events. Once the event is ascertained, a set of visual indicators, from among one or more visual indicators, associated with the event may be identified for being rendered by at least one alert generating unit, from among the plurality of alert generating units. Further, an activation signal may be transmitted to the at least one alert generating unit for rendering the set of visual indicators to indicate occurrence of the event.

9 Claims, 15 Drawing Sheets

(56) References Cited

U.S. PATENT DOCUMENTS

| | | | | |
|---|---|---|---|---|
| 2015/0278720 | A1* | 10/2015 | Nye ..................... | G06Q 10/063 |
| | | | | 705/7.11 |
| 2017/0192402 | A1* | 7/2017 | Karp ................. | H04M 1/72415 |
| 2017/0294094 | A1* | 10/2017 | Watkins ............. | G08B 21/0247 |
| 2019/0035242 | A1* | 1/2019 | Vazirani ........... | G08B 13/19695 |
| 2020/0011696 | A1* | 1/2020 | Vijayakumari Mahasenan .......... | |
| | | | | G06Q 10/087 |
| 2022/0230521 | A1* | 7/2022 | Trundle ............. | H04L 41/0213 |
| 2023/0017059 | A1* | 1/2023 | Donegan ................. | G10L 15/22 |
| 2023/0284178 | A1* | 9/2023 | Parker ...................... | G01S 5/01 |
| | | | | 455/456.1 |

\* cited by examiner

306
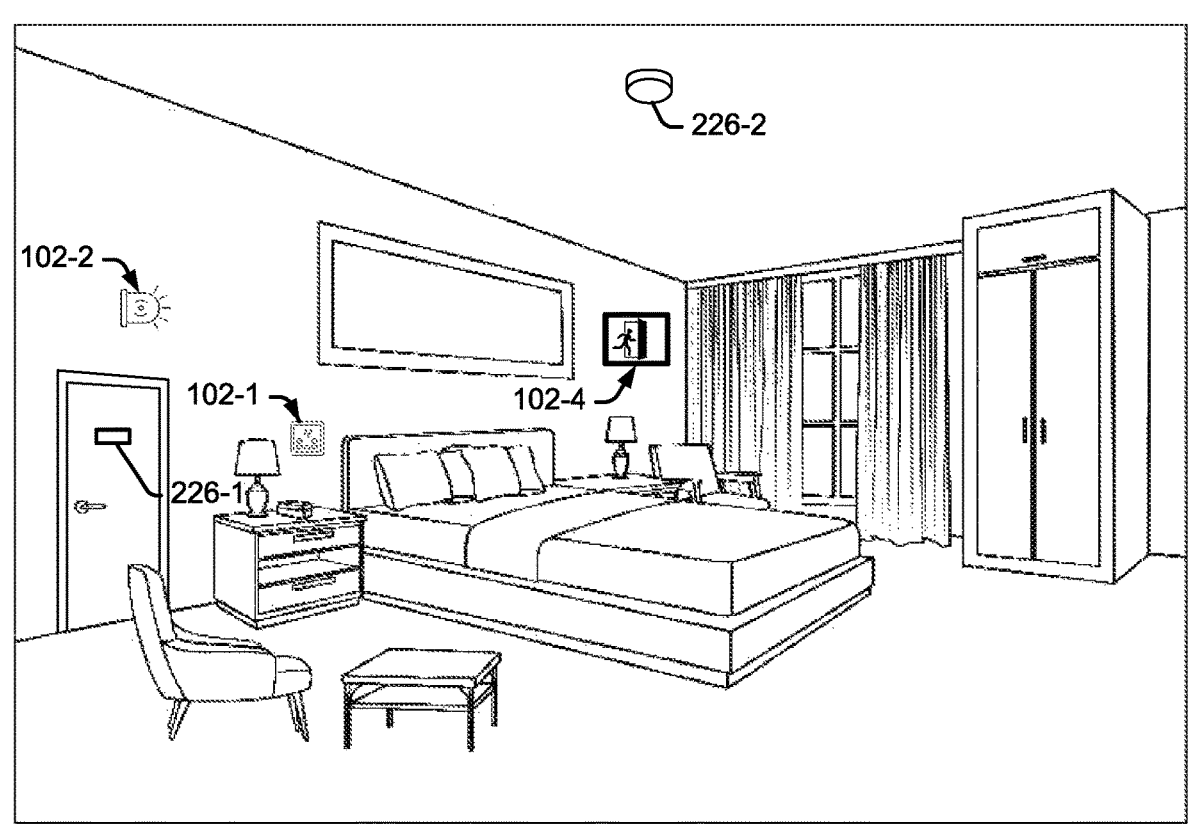
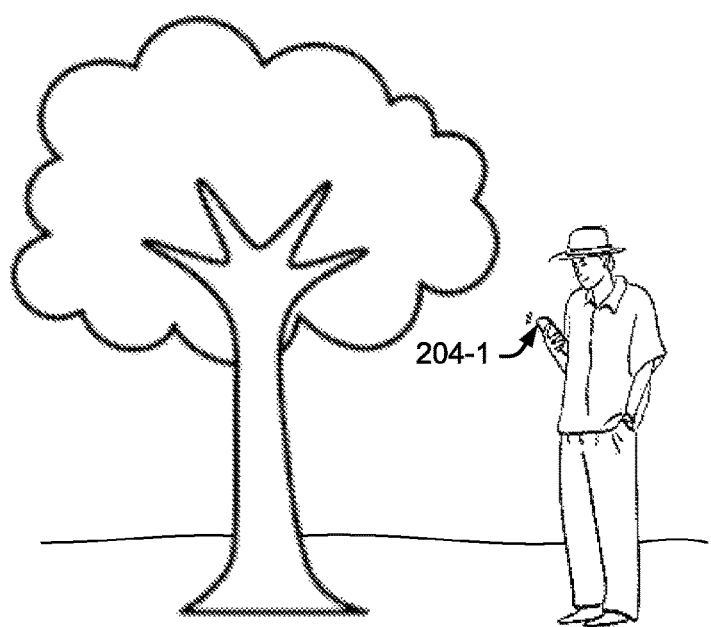
Figure 3D

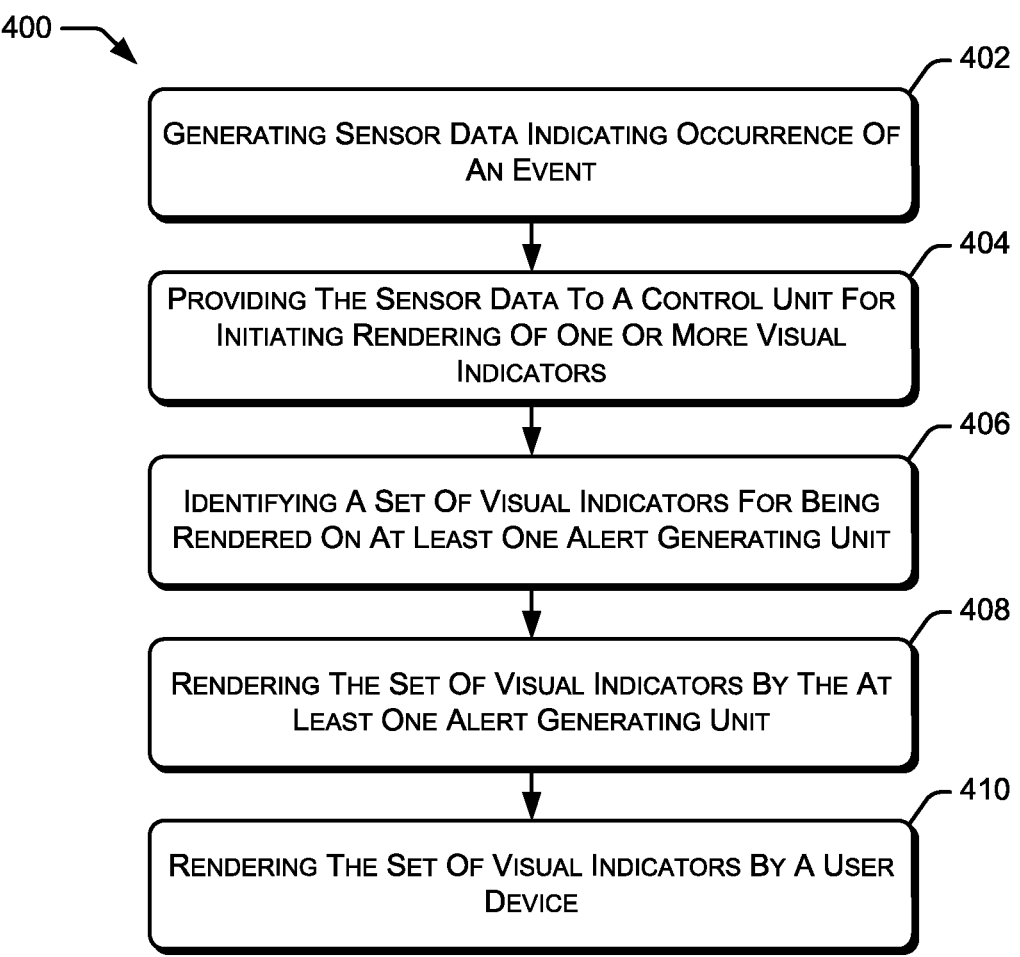

400

402
GENERATING SENSOR DATA INDICATING OCCURRENCE OF AN EVENT

404
PROVIDING THE SENSOR DATA TO A CONTROL UNIT FOR INITIATING RENDERING OF ONE OR MORE VISUAL INDICATORS

406
IDENTIFYING A SET OF VISUAL INDICATORS FOR BEING RENDERED ON AT LEAST ONE ALERT GENERATING UNIT

408
RENDERING THE SET OF VISUAL INDICATORS BY THE AT LEAST ONE ALERT GENERATING UNIT

410
RENDERING THE SET OF VISUAL INDICATORS BY A USER DEVICE

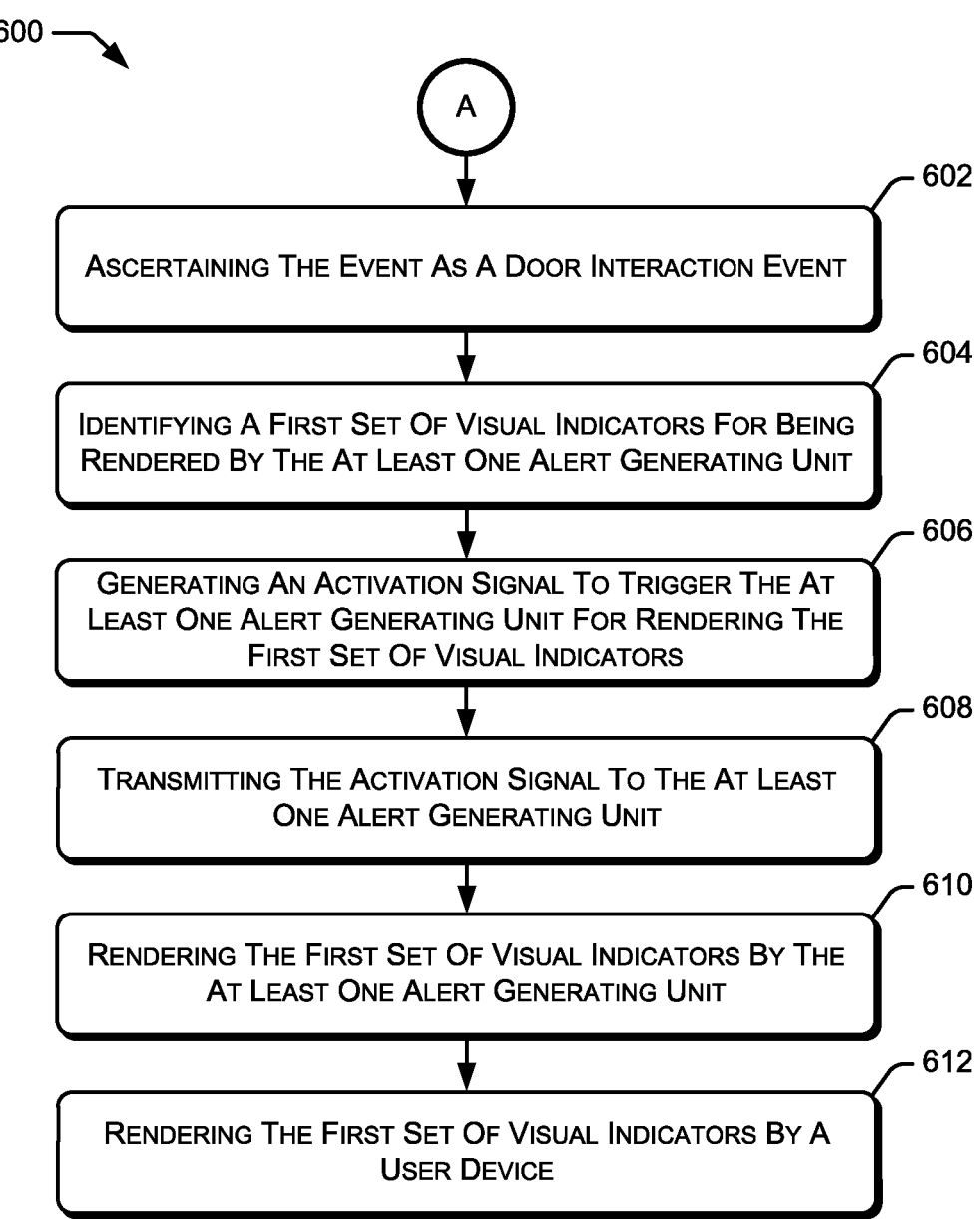

602

ASCERTAINING THE EVENT AS A DOOR INTERACTION EVENT

604

IDENTIFYING A FIRST SET OF VISUAL INDICATORS FOR BEING RENDERED BY THE AT LEAST ONE ALERT GENERATING UNIT

606

GENERATING AN ACTIVATION SIGNAL TO TRIGGER THE AT LEAST ONE ALERT GENERATING UNIT FOR RENDERING THE FIRST SET OF VISUAL INDICATORS

608

TRANSMITTING THE ACTIVATION SIGNAL TO THE AT LEAST ONE ALERT GENERATING UNIT

610

RENDERING THE FIRST SET OF VISUAL INDICATORS BY THE AT LEAST ONE ALERT GENERATING UNIT

612

RENDERING THE FIRST SET OF VISUAL INDICATORS BY A USER DEVICE

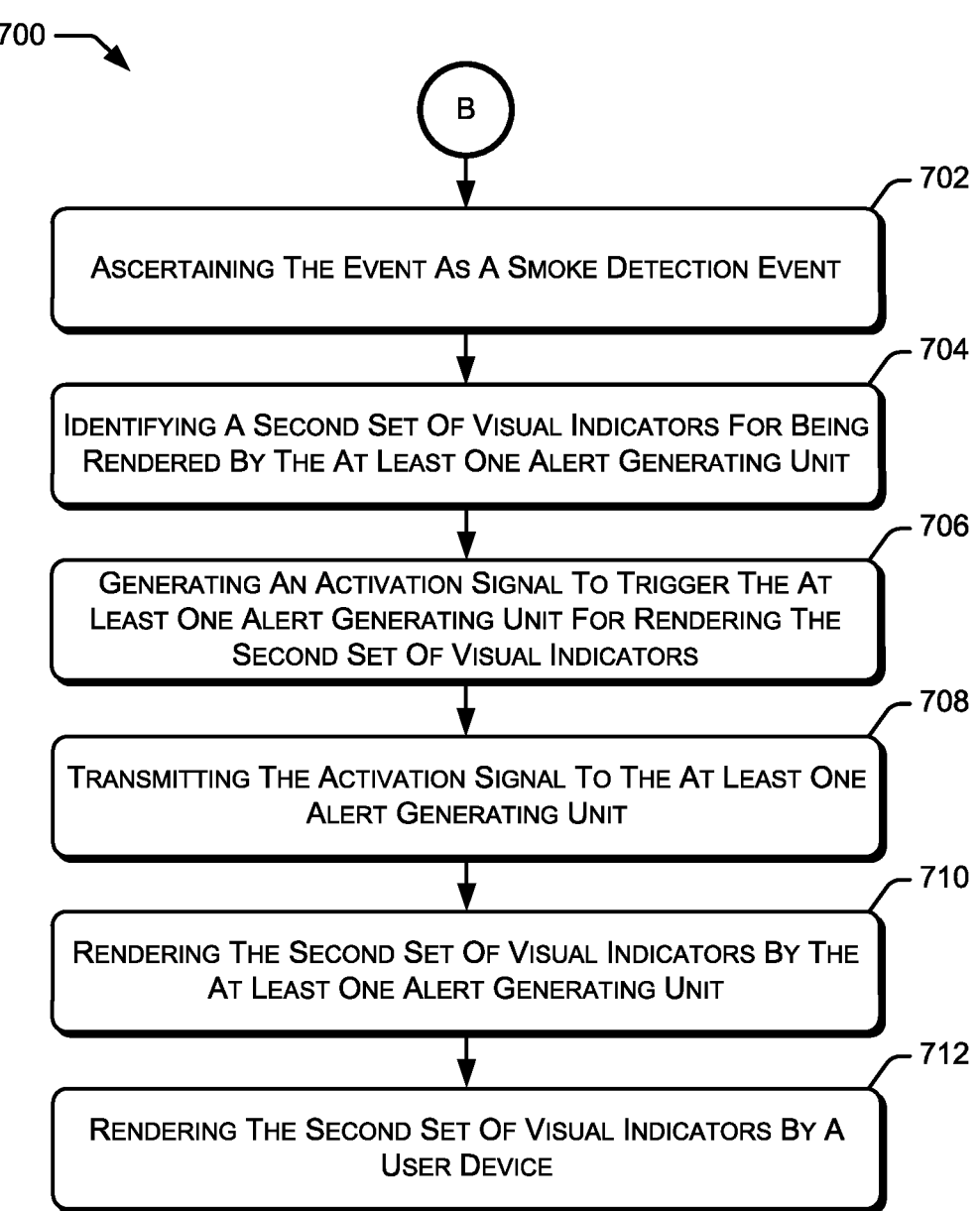

B

702

ASCERTAINING THE EVENT AS A SMOKE DETECTION EVENT

704

IDENTIFYING A SECOND SET OF VISUAL INDICATORS FOR BEING RENDERED BY THE AT LEAST ONE ALERT GENERATING UNIT

706

GENERATING AN ACTIVATION SIGNAL TO TRIGGER THE AT LEAST ONE ALERT GENERATING UNIT FOR RENDERING THE SECOND SET OF VISUAL INDICATORS

708

TRANSMITTING THE ACTIVATION SIGNAL TO THE AT LEAST ONE ALERT GENERATING UNIT

710

RENDERING THE SECOND SET OF VISUAL INDICATORS BY THE AT LEAST ONE ALERT GENERATING UNIT

712

RENDERING THE SECOND SET OF VISUAL INDICATORS BY A USER DEVICE

Figure 7

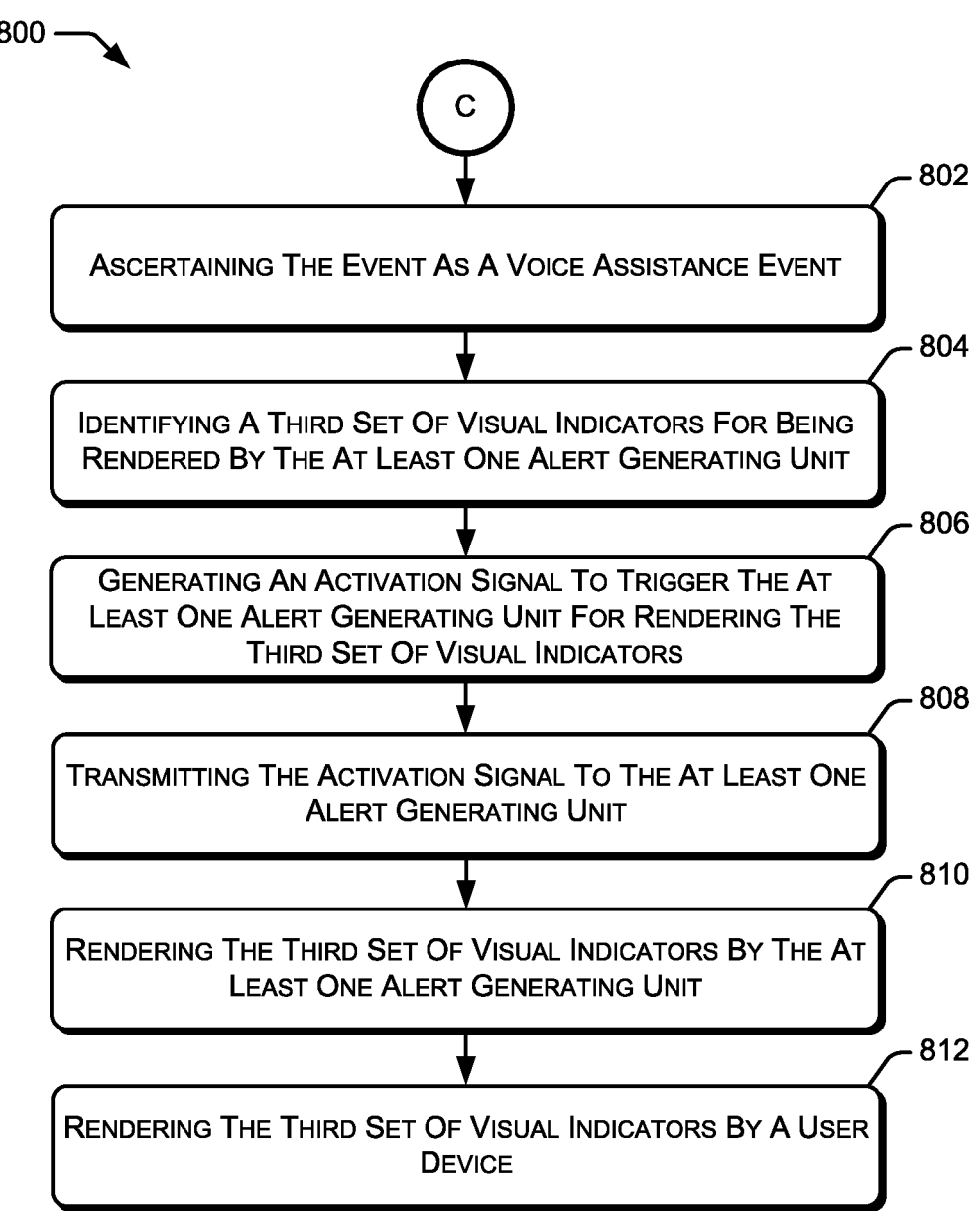

800

C

ASCERTAINING THE EVENT AS A VOICE ASSISTANCE EVENT — 802

IDENTIFYING A THIRD SET OF VISUAL INDICATORS FOR BEING RENDERED BY THE AT LEAST ONE ALERT GENERATING UNIT — 804

GENERATING AN ACTIVATION SIGNAL TO TRIGGER THE AT LEAST ONE ALERT GENERATING UNIT FOR RENDERING THE THIRD SET OF VISUAL INDICATORS — 806

TRANSMITTING THE ACTIVATION SIGNAL TO THE AT LEAST ONE ALERT GENERATING UNIT — 808

RENDERING THE THIRD SET OF VISUAL INDICATORS BY THE AT LEAST ONE ALERT GENERATING UNIT — 810

RENDERING THE THIRD SET OF VISUAL INDICATORS BY A USER DEVICE — 812

Figure 8

ALERT MANAGEMENT SYSTEM

BACKGROUND

In recent years, buildings, such as commercial and residential establishments are being modernized to enhance quality of life of occupants of the building and transform the way these establishments operate. For instance, buildings are being integrated with various systems for digital transformation and to improve safety and interactivity for occupants in their premises. These systems may provide the occupants with facilities related to, for example, communication, connectivity, surveillance, building automation, Heating, Ventilation, and Air Conditioning (HVAC) controls, smoke detection, and other safety and security features. Such systems may generally be backed by interlinked functionality between different hardware components, mostly located within the premises, and software applications.

BRIEF DESCRIPTION OF FIGURES

Systems and/or methods, in accordance with examples of the present subject matter are now described and with reference to the accompanying figures, in which:

FIG. 3D illustrates a room within a hotel as an exemplary premises, according to yet another example implementation.

FIG. 4 illustrates a method for managing alerts, according to an example implementation of the present subject matter.

FIG. 6 illustrates a method for managing alerts on occurrence of a door interaction event, according to an example implementation of the present subject matter.

FIG. 7 illustrates a method for managing alerts on occurrence of a smoke detection event, according to an example implementation of the present subject matter.

FIG. 8 illustrates a method for managing alerts on occurrence of a voice assistance event, according to an example implementation of the present subject matter.

DETAILED DESCRIPTION

Figure 1:
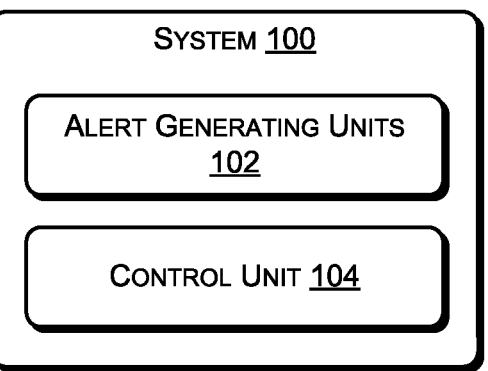
FIG. 1 illustrates a block diagram of a system, according to one example implementation.

With advancement in technology, various building solutions are being developed and integrated in buildings for their digital transformation and modernization. For instance, buildings, such as commercial and residential establishments may seamlessly be integrated with different hardware components, backed by software applications, to enhance safety, communication, and interactive experience of its occupants. Some such integrated solutions may include, for example, communication and connectivity solutions, fire and smoke detection solutions, surveillance solutions, and other safety and security solutions.

However, such solutions may require installation of multiple devices or systems, each configured to separately perform their respective functionality. Such disconnected systems tend to introduce several challenges. For example, different systems may be required to be installed in premises of a building, with each system being configured to dedicatedly to detect occurrence of different unexpected events, such as fire, gas leakage, or intrusion in the premises. On detection of such events, respective systems may generate alerts. As an example, a smoke detection system and a surveillance system may be installed within the premises. The smoke detection system may have its own sensor(s) and processing unit(s), for detecting presence of smoke, along with alerting device(s), such as a siren, for rendering audio and visual alerts. Whereas, the surveillance system may have its own sensor(s) and processing unit(s), to sense a possible intrusion, and alerting device(s) to render audio and visual alerts. However, installing multiple systems, each operating individually, may require installation of multiple hardware components, including sensor(s), processing unit(s), wirings, and alerting device(s), for effectively encountering different events. As a result, installation of such systems may increase installation, control, and maintenance complexities. The complexity may further increase with number of systems installed within the premises.

Such disconnectedness may introduce further limitations. For example, in case of malfunctioning of any component, say the alerting device, dedicatedly associated with a system, the system may not be able provide an alert using the alerting device associated with any other system. For instance, in case the alerting device associated with the smoke detection system malfunctions, the smoke detection system may not be able to provide any alert using the alerting devices of the surveillance system. Thus, due to disconnectedness, the systems may not have any alternative options for providing alerts to the occupants and the occupants may eventually fail to receive any notification of occurrence of the event.

Such systems may also have very limited methods of providing the alerts. For example, to perceive such alerts, the occupant may have to be present within the premises. In one example, in case smoke is detected within the premises, such as within a room associated with the occupant, the occupant may not be able to receive any of the alerts being generated within the premises if the occupant is not present within the premises. Further, even if the occupant is within the premises, the occupant is required to be within the vicinity of the alerting device so that the audio/visual alert can easily be perceived. For example, to notice a visual alert, such as lighting up of an emergency sign board, the sign board is required to be in line-of-sight of the occupant. The audio alerts may also fail to provide an alert to a hearing-impaired person. Thus, such systems have very limited methods of delivering alerts to users, such as the occupants.

Further, such systems are typically designed to alert the occupants about emergency situations and fail to provide other assistance to occupants, especially, to occupants having special requirements. For instance, a hearing-impaired person may not be able to perceive occurrence of other events or situations within their premises where, for example, audio alerts are main source of indications. For example, a hearing-impaired person may not be able to hear a doorbell or knocking of a door of his room and such events may go unanswered. The existing solutions may thus be inefficient and inconvenient for people having special requirements.

Approaches for managing alerts on detecting occurrence of different events within a premises, are described. Examples of the premises may include, but are not limited to, a building, area around the building and belonging to the building, and at least a partially open area of interest. The building may be a commercial or a residential establishment, for example, a residential apartment, a hotel, an inn, a motel, a resort, an educational institute, a commercial complex, an industrial establishment, a data center, a storage facility, a hospital, a multi-level parking, and a stadium.

Further, the events may be defined as occurrences of incidents within the premises that may require attention of one or more users, for example, the occupants, staff of the building, and people associated with emergency services. Examples of such events may include, but are not limited to, a door interaction event, a smoke detection event, and a voice assistance event. In one example, the door interaction event may indicate reception of one or more knocks on a door located within the premises. In another example, the door interaction event may indicate ringing of a doorbell associated with the door. The door, for example, may be of a room occupied by a user within the building, such as a hotel or a residential apartment. The smoke detection event may indicate, for example, detection of smoke within the premises. The voice assistance event may indicate reception of voice commands from the user located within the premises.

According to the present subject matter, one or more alert generating units may be provided within the premises to render alerts corresponding to occurrence of one or more events within the premises. The alerts may be provided in the form of visual indicators associated with the event having occurred within the premises. In one example, each alert generating unit may be enabled to render visual indicators associated with all the events occurring within the premises. The set of visual indicators may also be rendered on a user device of the occupant of the premises. Enabling rendering of alerts for different events on the same alert generating unit may help reduce the numbers of systems required for event management within the premises. Further, providing alerts for knock on door may assist a hearing-impaired occupant to ascertain presence of another occupant on the door. In addition, providing alerts on the user device may effectively alert the occupant even if the occupant is not in proximity to the alert generating unit.

According to one example implementation, a system for managing alerts based on occurrence of events has been disclosed. The system may include a sensing unit, a plurality of alert generating units, and a control unit. The sensing unit may include one or more sensors that may be located at different locations within the premises. Examples of the sensors may include, but are not limited to, a smoke detector, a vibration sensor, and a microphone. The one or more sensors may generate sensor data indicating environmental changes around their location. For example, the vibration sensor may generate vibration data, that may indicate detection of vibrations due to knocking on door. The sensor data may thus indicate occurrence of an event within the premises, from among the plurality of events.

The sensor data may be subsequently processed by a control unit to ascertain occurrence of the event. For example, if the control unit determines the sensor data to be the vibration data, the control unit may ascertain occurrence of the door interaction event. Based on the event, the control unit may identify a set of visual indicators associated with the event for being rendered on at least one alert generating unit, from the plurality of alert generating units. For example, on ascertaining occurrence of the door interaction event, the control unit may identify that a first set of visual indicators are to be rendered on at least one alert generating unit.

In one example implementation, the control unit may also identify the alert generating unit, from among the plurality of alert generating units, based on their operational state. In one example, when an alert generating unit is functionally inoperative, the operational state of such alert generating unit may be determined as passive. Whereas, when the alert generating unit is functionally operative, the operational state of such alert generating unit may be determined as active. The control unit may identify the alert generating unit that has an active operational state. The control unit may thus avoid identifying a non-functional alert generating unit for rendering the set of visual indicators.

Once the alert generating unit is identified, the control unit may transmit an activation signal to the at least one alert generating unit for rendering the set of visual indicators. In one example, the alert generating units may be located within the premises and may include one or more display devices or Light Emitting Diodes (LEDs) for rendering the set of visual indicators. On receiving the activation signal, the identified alert generating unit may initiate rendering of the set of visual indicators associated with the event. Returning to the previous example, the first set of visual indicators may include, for example, blinking of one or more LEDs of the alert generating unit. In another example, the first set of visual indicators may be a symbolic indicator associated with the event that may be rendered on the one or more display devices of the alert generating unit. For example, in case of the door interaction event a first symbolic indicator may be rendered on the display devices, whereas in the case of the smoke detection event, a second symbolic indicator may be rendered on the display devices. The user may thus be able to easily perceive the visual indicators and identify the event, from the plurality of events.

In one example implementation, the activation signal may also be provided to at least one user device for rendering the set of visual indicators. The at least one user device may, in one example, be a portable communication device of the occupant.

Thus, according to the present subject matter, providing alerts, including the visual indicators, may effectively alert the occupant about occurrence of the event. Such alerts may also assist specially abled occupants, such hearing-impaired occupants. For instance, by providing alerts in the form of visual indicators on occurrence of the door interaction event, a hearing-impaired occupant may effectively be able to perceive the alert and be informed of someone knocking the door. The occupant may thus be able to respond accordingly to the event. Further, by rendering the visual indicators on the user device, such as a mobile phone of the occupant, the occupant may be informed about the event irrespective of the occupant's proximity to the alert generating units.

Further, as different visual indicators may be associated with different events, a single alert generating unit could be used for indicating occurrence of different events, unlike the conventional solutions having dedicated alert generating devices for each different event. For example, the first set of visual indicators may indicate occurrence of the door interaction event, whereas a second set of visual indicators may indicate occurrence of the smoke detection event. Also, as occurrence of different events may be ascertained using the sensors located within the premises, disconnectedness between multiple systems may be reduced and a centralized system may be used for detection of multiple events and management of alerts. Therefore, installation and management complexities associated with the conventional solutions may be reduced, while enhancing perceivability of alerts.

Further, as the alert generating units may be identified based on their operational status, only functional alert generating unit may be selected for rendering the visual indicator. The present subject matter may thus reduce dependence on specific alert generating units and provide alternate options for rendering alerts for the occupants.

The present subject matter is further described with reference to FIGS. 1 to 9. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of a system 100, according to one example implementation. In one example, the system 100 may be a distributed computing system having one or more physical computing systems geographically distributed at same or different locations. In another example, one or more components of the system 100 may be hosted virtually, for example, on a cloud-based platform. In yet another example, the system 100 may be a stand-alone system located inside a premises. Examples of the premises may include, but are not limited to, a building, a perimeter of interest around the building, and an area belonging to the building, including a covered or uncovered area. The building may be a commercial or a residential establishment, for example, a residential apartment, a hotel, an inn, a motel, a resort, an educational institute, a commercial complex, an industrial establishment, a data center, a storage facility, and a hospital. Further, a building may also refer to a combination of two or more structures or compounds.

In one example, the system 100 may manage alerts based on ascertaining occurrence of events. The system 100 may be configured to detect occurrences of a plurality of events within the premises. The events may be any act or incidence that may require attention of one or more users, interchangeably referred to as one or more occupants. Examples of the events may include, but are not limited to, a door interaction event, a smoke detection event, and a voice assistance event. Upon occurrence of an event, from among the plurality of events, the system 100 may accordingly manage rendering of one or more alerts. The alerts may include, for example, audio alerts, visual alerts, and a combination thereof.

The system 100 may include a plurality of alert generating units 102 and a control unit 104. The alert generating units 102 and the control unit 104 may be communicably coupled with each other. In one example, the plurality of alert generating units 102 may be located within the premises. Examples of the alert generating units 102 may include, but are not limited to, a smart bulb, a thermostat, and a Human Machine Interface Device (HMI) located within the premises. Each of the plurality of alert generating units 102 may be configured to render alerts, including one or more visual indicators. In one example, each of the alert generating units 102 may include at least one of a display device and a Light Emitting Diode (LED) device to render the one or more visual indicators. Each of the one or more visual indicators may be associated with at least one event and may thus indicate occurrence of the associated event.

Further, the control unit 104 may be configured to ascertain occurrence of the event from among the plurality of events. In one example implementation, the control unit 104 may determine occurrence of the event based on sensor data. In one example, the control unit 104 may be communicably coupled with a sensing unit generating the sensor data. The sensing unit may be located within the premises and may include a plurality of sensors. Examples of the sensors may include, but are not limited to, smoke detectors, vibration sensors, and microphones. Each of the plurality of sensors may be located at different locations within the premises and may sense changes in conditions around their location. Each sensor may further generate the sensor data. For example, the vibration sensor, located on a door within the premises, may generate vibration data indicating reception of mechanical force on the door, for instance, due to knocking or pressing of a doorbell. Similarly, the smoke detector, located on a ceiling within the premises, may generate smoke data indicating detection of smoke in the vicinity; and the microphone, located within the premises, may generate voice data indicating reception of one or more voice commands from an occupant located within the premises. The sensor data may thus indicate occurrence of the event within the premises, from among the plurality of events.

The control unit 104 may subsequently receive and process the sensor data to ascertain occurrence of the event, from among the plurality of events. In one example, to ascertain the event, the control unit 104 may determine if the sensor data is one of the vibration data, the smoke data, and the voice data. If the control unit 104 determines the sensor data to be the vibration data, the control unit 104 may determine that the door may have experienced mechanical force, for example, due to one or more knocks or pressing of the doorbell. The control unit 104 may thus ascertain the event as the door interaction event. However, if the control unit 104 determines the sensor data to be the smoke data, the control unit 104 may determine that smoke may be present within the premises. The control unit 104 may thus ascertain occurrence of the smoke detection event. If the sensor data is determined to be the voice data, the control unit 104 may process the voice data to determine reception of the voice command from the occupant. Based on the processing, the control unit 104 may ascertain occurrence of the voice assistance event.

Based on the event, the control unit 104 may identify a set of visual indicators, from among the one or more visual indicators, for being rendered on at least one alert generating unit, from among the plurality of alert generating units 102. In one example, a set of visual indicators may be associated with each of the plurality of events. For example, a first set of visual indicators may be associated with the door interaction event, a second set of visual indicators may be associated with the smoke detection event, and a third set of visual indicators may be associated with the voice assistance event. Each of the sets of visual indicators may include, for example, a visual indicator or a combination of two or more visual indicators, from among the one or more visual indicators. In one example, each set of visual indicators may be different from each other and may thus be indicative of respective events.

The control unit 104 may then control rendering of the set of visual indicators. For example, on ascertaining the event as the door interaction event, the control unit 104 may identify the first set of visual indicators for being rendered on at least one alert generating unit from among the plurality of alert generating units 102. In one example, the control unit 104 may determine that the first set of indicators may be rendered on the thermostat located within the premises. Similarly, on ascertaining the event as the smoke detection event, the control unit 104 may identify the second set of visual indicators for being rendered on either the thermostat and/or the smart bulb located within the premises. On ascertaining the event as the voice assistance event, the control unit 104 may identify the third set of visual indicators for being rendered, for example, on at least the HMI device.

The control unit 104, in one example, may then transmit an activation signal to the at least one alert generating unit 102 for rendering the set of visual indicators identified based on the event. Upon receiving the activation signal, the alert generating unit 102 may render the set of visual indicators, for example, by using at least one of the display device and the LED device. Therefore, the same alert generating unit may be used for generating different sets of visual indicators to indicate different events. The occupant may perceive the set of visual indicators and may accordingly be able to recognize occurrence of different events within the premises.

Further, in one example implementation, the activation signal generated by the control unit 104 may also be provided to a user device. The user device may be, in one example, a mobile phone associated with the occupant, as will be discussed in detail. On receiving the activation signal, the user device may render the identified set of indicators to notify the occupant about occurrence of the event. Thus, the occupant may be notified about different events even when the occupant may be located outside the premises.

FIGS. 2A-2D illustrate a computing environment 200 implementing the system 100, according to an example implementation of the present subject matter. In one example, the computing environment 200 may include the system 100, a sensing unit 202, and user device(s) 204. The system 100 may be communicably coupled with the sensing unit 202 and the user device(s) 204 over a communication network 206. The communication network 206 may be a wireless network, a wired network, or a combination thereof. The communication network 206 may also be an individual network or a collection of many such individual networks, interconnected with each other and functioning as a single large network, e.g., the Internet or an intranet. Examples of such individual networks include local area network (LAN), wide area network (WAN), the internet, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 206 may include various network entities, such as transceivers, gateways, and routers. In an example, the communication network 206 may include any communication network that uses any of the commonly used protocols, for example, Hypertext Transfer Protocol (HTTP), and Transmission Control Protocol/Internet Protocol (TCP/IP). The system 100, the sensing unit 202, and the user device(s) 204 may thus be communicably coupled with each other over the communication network 206 and may exchange data and signals.

Figure 3A:
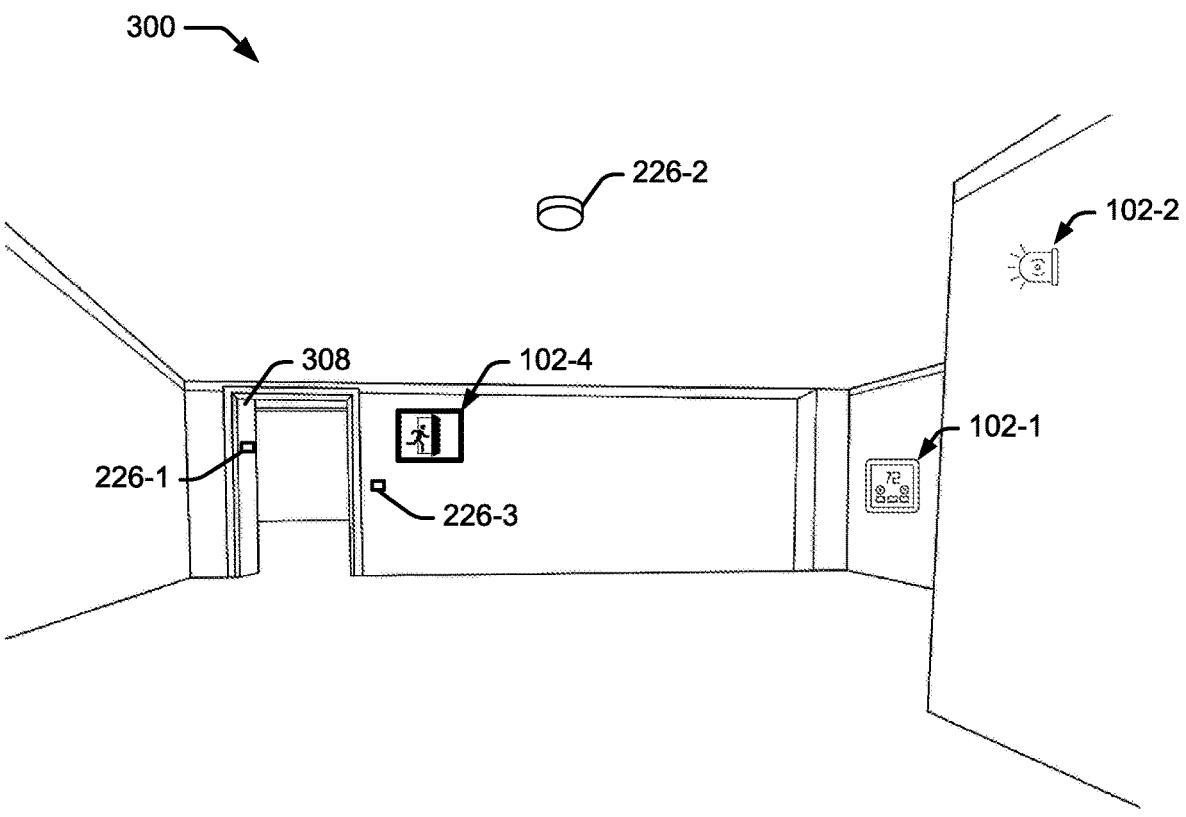
FIG. 3A illustrates a commercial or a residential establishment as an exemplary premises, according to an example implementation.
Figure 3B:
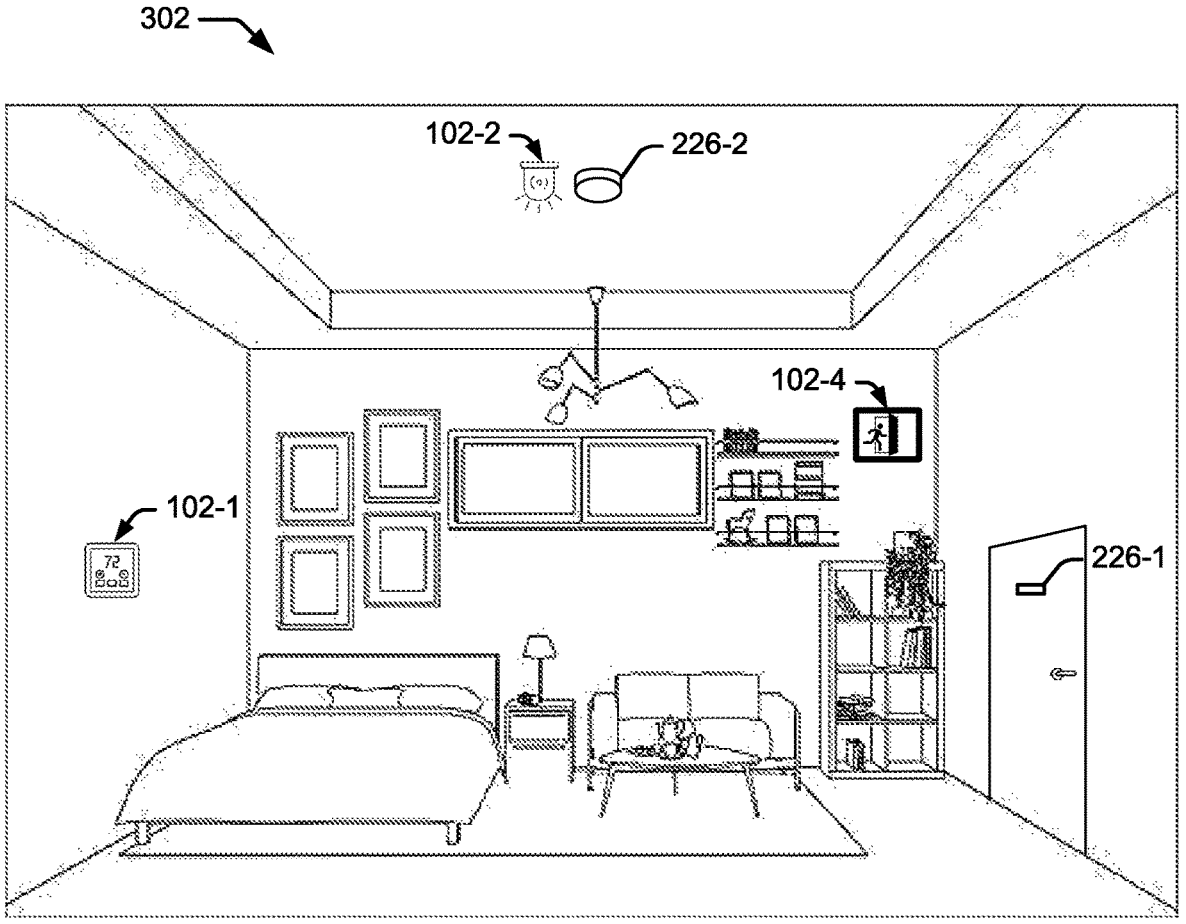
FIG. 3B illustrates a room in a house as an exemplary premises, according to another example implementation.
Figure 3C:
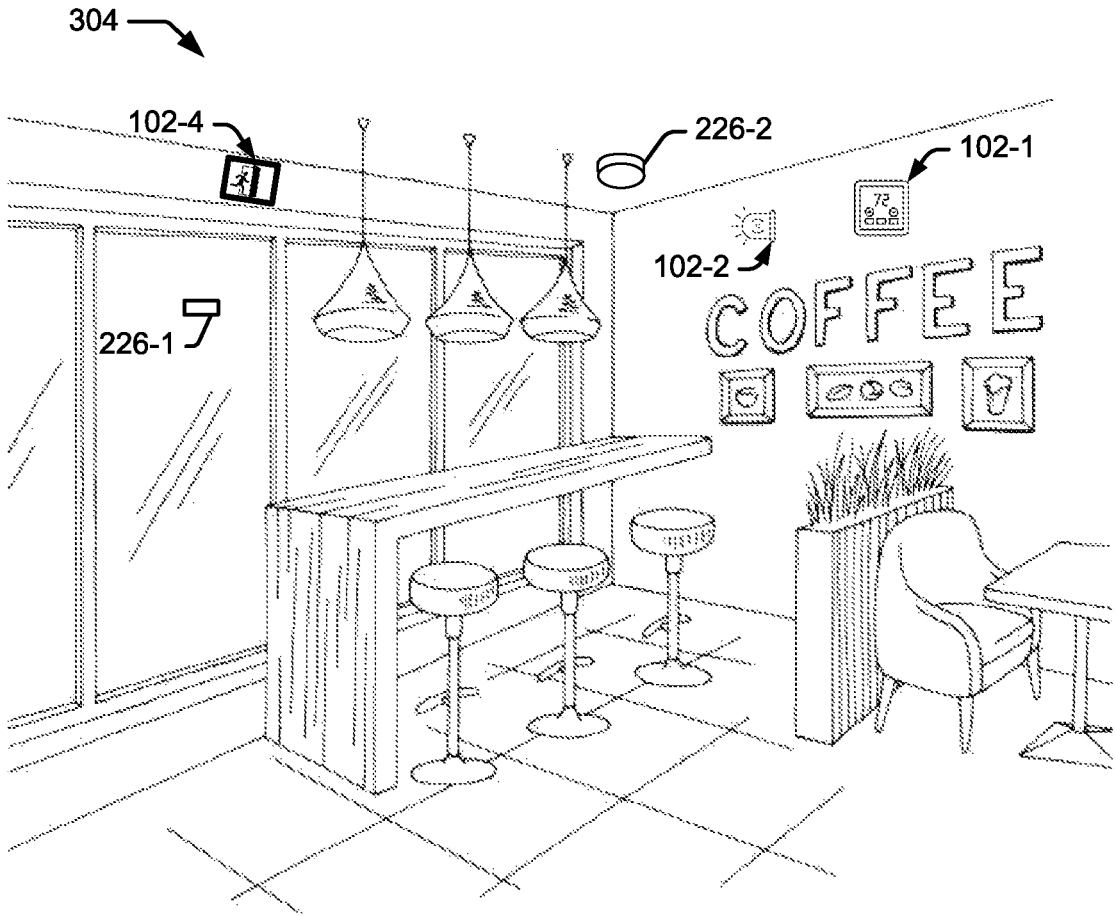
FIG. 3C illustrates a restaurant as an exemplary premises, according to another example implementation.

In one example, the system 100 may manage alerts on ascertaining occurrences of different events within a premises. The premises may be, for example, a building and an area of land belonging to the building. The building may be a commercial or a residential establishment, for example, a data center, a warehouse, a hotel, an inn, a motel, a resort, a residential apartment, an educational institute, a commercial complex, an industrial establishment, and a hospital. Some illustrative examples of the premises have been illustrated in FIGS. 3A to 3D. FIG. 3A illustrates a commercial or a residential establishment as an exemplary premises 300, according to an example implementation. FIG. 3B illustrates a room in a house as an exemplary premises 302, according to another example implementation. FIG. 3C illustrates a restaurant as an exemplary premises 304, according to another example implementation. FIG. 3D illustrates a room within a hotel as an exemplary premises 306, according to yet another example implementation. The above examples of the premises 300-306 are provided only as illustrative examples for the purpose of explanation and other implementations of the premises may also be possible. For example, the premises may also include a group of two or more buildings and area associated with the buildings.

Further, the events may be defined as occurrences of acts and incidences within the premises that may require attention of one or more users, for example, one or more occupants, owner of the building, staff of the building, and people associated with emergency services. Examples of such events may include, but are not limited to, a door interaction event, a smoke detection event, and a voice assistance event. In one example, the door interaction event may indicate reception of force on a door located inside the premises. The force may be a mechanical force experienced, for example, by the door, due to knocking on the door, ringing of a doorbell associated with the door, or due to a push on the door to open the door. The door may be any door located within the premises. In one example, the door may be a door of a room located within the premises. The room, for example, may be a room occupied by an occupant within the building, such as a hotel or an office. In another example, the door may be located at a boundary or perimeter of the premises. For example, the door may be a main entry door of the premises.

Further, in one example, the smoke detection event may indicate detection of smoke within the premises. For example, the smoke detection event may indicate detection of smoke in a room or a particular floor of the premises. The smoke detection event may thus also be indicative of a potential fire breakout within the premises.

Furthermore, in one example, the voice assistance event may indicate reception of one or more voice commands from the occupants located within the premises. The voice assistance event may be triggered on reception of one or more voice commands from the occupant. The voice commands may be, for instance, a message to be conveyed to one or more users. In one example, an occupant present in a room within a hotel may send a voice command to staff of the hotel for requesting any service. In another example, the voice assistance event may be triggered by a user, for instance, a security staff to convey a message to another user located within the premises.

Further, in one example, the system 100 may include a plurality of alert generating units, such as the alert generating units 102 and a control unit, such as the control unit 104. In one example, the alert generating units 102 may be used for rendering one or more alerts to alert the occupants of the premises. The one or more alerts may include audio indicators, one or more visual indicators, and a combination thereof. The plurality of alert generating units 102 may include, for example, a first alert generating unit 102-1, a second alert generating unit 102-2, a third alert generating unit 102-3, a fourth alert generating unit 102-4 . . . a $N^{th}$ alert generating unit 102-N, where N is a natural number. Examples of the alert generating units 102 may include, but are not limited to, a thermostat, a smart bulb, an emergency sign board, and a warning light. For example, the first alert generating unit 102-1 may be the thermostat, the second alert generating unit 102-2 may be the smart bulb, and third alert generating unit 102-3 may be a tablet, the fourth alert generating unit 102-4 may be an emergency sign board, and the $N^{th}$ alert generating unit 102-N may be a walkie talkie, as exemplarily illustrated in FIGS. 2B-2D. The first alert generating unit 102-1, the second alert generating unit 102-2, the third alert generating unit 102-3, . . . , the $N^{th}$ alert generating unit 102-N may hereinafter interchangeably and collectively be referred to as the alert generating units 102 and individually as the alert generating unit 102.

In one example, the alert generating units 102 may be located at different locations inside the premises. FIGS. 3A-3D also illustrate exemplary locations within the premises where the alert generating units 102 may be located. As exemplarily illustrated in FIG. 3A, the first alert generating unit 102-1, such as the thermostat, may be located on a first wall within the premises 300, the second alert generating unit 102-2, such as the smart bulb, may be located on a second wall, and the fourth alert generating unit 102-4, such as the emergency sign board, may be located on a third wall within the premises 300. FIG. 3B exemplarily illustrates that the first alert generating unit 102-1 may be located on a first wall within the room 302, the second alert generating unit 102-2 may be located on a ceiling within the room 302, and the fourth alert generating unit 102-4 may be located on a second wall within the room 302. Similarly, FIGS. 3C and 3D illustrate different locations of the alert generating units 102 within the restaurant 304 and the room 306 in the hotel. In addition to the above exemplary devices, some of the alert generating units 102 may also be associated with other users. In one example, the alert generating units 102 may also include devices associated with, for instance, staff of the hotel and emergency services. In one example, the third alert generating unit 102-3, such as the tablet, may be associated, for instance, with staff of the hotel. In one example, the third alert generating unit 102-3 may be a desktop computer associated with staff of the hotel. In one example, the $N^{th}$ alert generating unit 102-N, such as the walkie talkie, may be associated with people of the emergency services.

In one example, each of the plurality of alert generating units 102 may include at least one of a communication module, a processor, and one or more indication devices. For example, the first alert generating unit 102-1 may include at least one of a first communication module 208, a first processor 210, and a first indication device 212. The communication module may enable the alert generating unit 102 to communicate over the communication network 206. In one example, the first communication module 208 may allow the first alert generating unit 102-1 to communicate over the communication network 206 with other components, for instance the control unit 104, of the computing environment 200. The communication module may also enable exchange data and signals over the communication network 206. In one example, the communication module may be a wireless communication module. Examples of the communication module may include, but are not limited to, Global System for Mobile communication (GSM) module, a Code-division multiple access (CDMA) module, Bluetooth modules, network interface cards (NIC), Wi-Fi modules, dial-up modules, Integrated Services Digital Network (ISDN) modules, Digital Subscriber Line (DSL) modules, and cable modules. In one example, the communication module may also include one or more antennas to enable wireless transmission and reception of data and signals. The communication module may also be, for example, an Arduino module that may communicably couple the alert generating unit 102 with the communication network 206.

Further, the one or more indication devices may enable rendering of the one or more alerts, such as the audio indicators and the one or more visual indicators. In one example, the one or more indication devices may include at least one of a display device, a Light Emitting Diode (LED) device, and other module(s) for rendering the one or more alerts. In one example, the first indication device 212 may include at least one of a first display device 214, a first LED device 216, and other module(s) 218. The display device and the LED device may render the one or more visual indicators. The one or more visual indicators may include, for example, a graphical alert, a text message, a symbolic alert, or one or more images that may be rendered on the display device. The one or more visual indicators may also include blinking of the LED device, changing color of light emitted by the LED device, and blinking pattern of the LED device. In one example, each of the one or more visual indicators may be associated with at least one event and may thus indicate occurrence of the associated event. As exemplarily illustrated in FIGS. 2A-2C, multiple alert generating units 102 may be located within the premises to render the alerts on different events, with each alert generating unit 102 being individually capable of rendering alerts of all events. However, as exemplarily illustrated in FIG. 2D, a single alert generating unit 102 equipped with multiple indication devices for rendering the alerts on occurrence of different events.

Examples of the display device may include, but are not limited to, a liquid crystal display (LCD) device, an LED display device, a thin film transistor (TFT) display device, Organic Light Emitting Diode (OLED) display device, Active-matrix organic light-emitting diode (AMOLED) display device, a capacitive touch screen, an in-plane switching (IPS) LCD display device, a module comprising one or more seven segment LED devices. Examples of the LED device may include, but are not limited to, a LED bulb, a group of two or more LEDs, one or more multi-color LED bulbs, and a panel comprising one or more LEDs.

Further, the other module(s) may include, in one example, audio alert generating module(s). Examples of the audio alert generating modules may include, but are not limited to, a buzzer and a speaker. The alert generating unit 102 may render the audio alerts using the audio alert generating modules. As exemplarily illustrated in FIGS. 2B and 2D, the alert generating units 102, for example the first alert generating unit 102-1, may include a buzzer 218-1. The other module(s) may further include, in one example, power supply module(s) and I/O interface(s). The power supply module(s) may control power supply to enable functioning of the display device and the LED device of the alert generating unit 102. The I/O interface(s) may enable the alert generating unit 102 to be connected to external device for exchanging signals and data.

Further, in one example, operations of the communication module and the one or more indication devices may be controlled by the processor. The processor may be communicably coupled with the communication module and the one or more indication device. In one example, the first processor 210 may be communicably coupled with the first communication module 208 and the first indication device 212 and may control operation of the first communication module 208 and the first indication device 212. For instance, the first processor 210 may activate or deactivate the first communication module 208 to control transmission and reception of data and signals. The first processor 210 may also control operation of the first indication device 212 to enable and disable rendering of the audio alerts and the one or more visual indicators, for example, by controlling activation and deactivation of the first display device 214, the first LED device 216, and the other module(s) 218.

The processor, for example the first processor 210, may be implemented as a dedicated processor, a shared processor, or a plurality of individual processors, some of which may be shared. Examples of the processor may include, but are not limited to, microprocessors, microcomputers, microcontrollers, digital signal processors, central processing units, state machines, logic circuitries, and/or any other devices that manipulate signals and data based on computer-readable instructions.

For the sake of brevity, the communication module, the processor, the indication device, and the other module(s) have been illustrated for first alert generating unit 102-1 only. However, it would be understood that other alert generating units, such as the second alert generating unit 102-2, the third alert generating unit 102-3, may also have similar sub-components as the first alert generating unit 102-1.

Further, in one example, the control unit 104 may be used for ascertaining occurrences of different events and accordingly control rendering of the one or more alerts. In one example, the control unit 104 may include a processing engine 220, a controller communication module 222, and memory 224. Functions performed by the control unit 104 may be controlled by the processing engine 220. In one example, the processing engine 220 may be a dedicated hardware capable of executing instructions. For example, the processing unit 220 may be a single dedicated processor, a single shared processor, or a plurality of individual processors, some of which may be shared. Other examples of the processing engine 220 may include, but are not limited to, microprocessors, microcomputers, microcontrollers, field programmable gate array (FPGA), digital signal processors (DSPs), central processing units, state machines, logic circuitries, and/or any other devices that manipulate signals and data based on computer-readable instructions.

Further, the controller communication module 222 may enable the control unit 104 to communicate over the communication network 206. In one example, the controller communication module 222 may enable the control unit 104 to communicate with other components of the computing environment 200, for instance the alert generating units 102, the sensing unit 202, and the user device(s) 204. The controller communication module 222 may also enable exchange of data and signals over the communication network 206. In one example, the controller communication module 222 may be a wireless communication module. Examples of the controller communication module 222 may include, but are not limited to, Global System for Mobile communication (GSM) module, a Code-division multiple access (CDMA) module, Bluetooth modules, network interface cards (NIC), Wi-Fi modules, dial-up modules, Integrated Services Digital Network (ISDN) modules, Digital Subscriber Line (DSL) modules, Arduino modules, ESP8266 modules, and cable modules. In one example, the controller communication module 222 may also include one or more antennas to enable wireless transmission and reception of data and signals.

Further, the memory 224 may store, in one example, one or more computer-readable instructions, which may be fetched and executed by the processing engine 220 for ascertaining occurrence of the events and manage rendering of the alerts. The memory 224 may include any non-transitory computer-readable medium including, for example, volatile memory such as Random Access Memory (RAM), or non-volatile memory such as Erasable Programmable Read-only Memory (EPROM), flash memory, and the like.

Figure 2A:
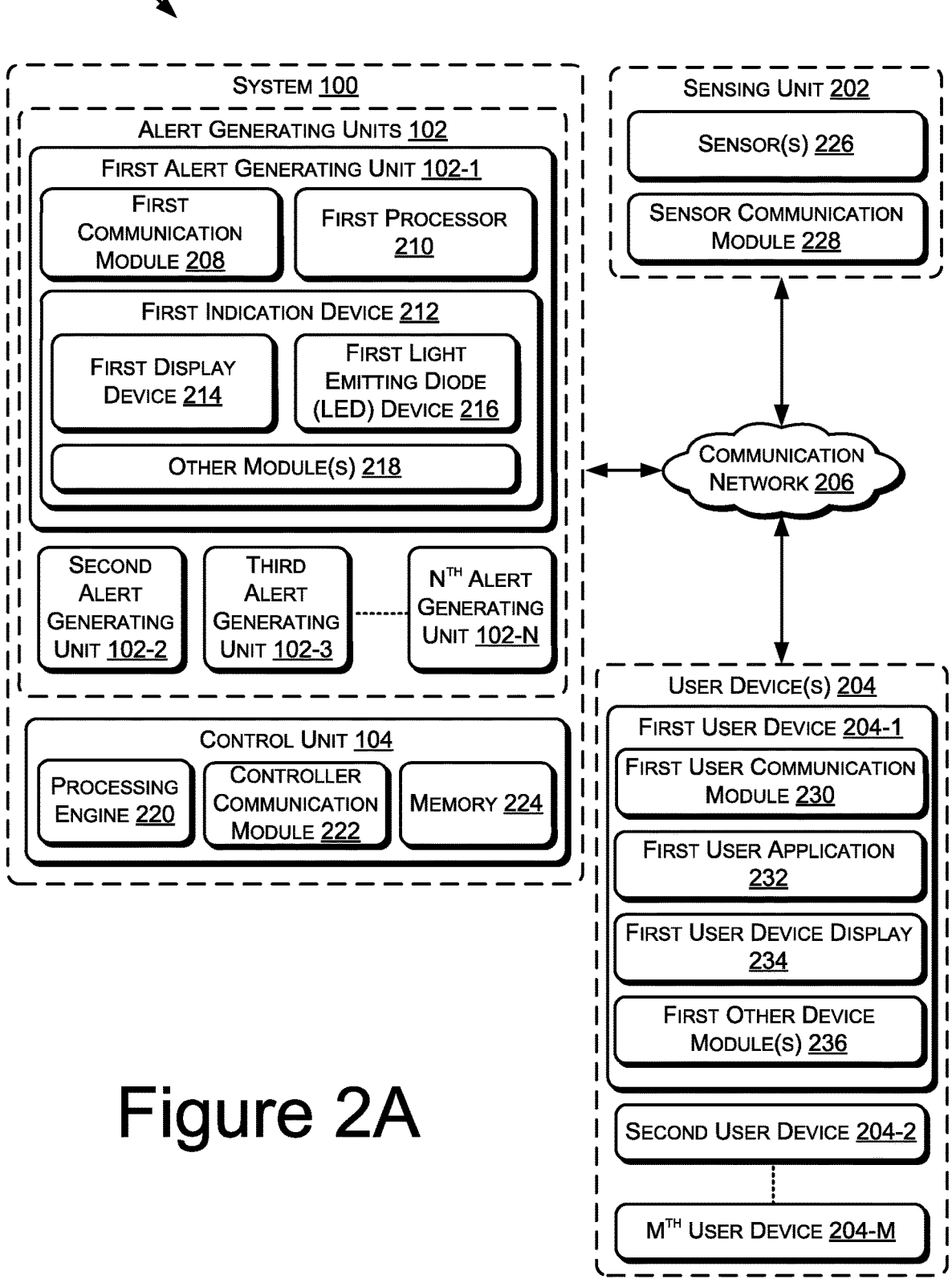
FIGS. 2A-2D illustrate a computing environment implementing the system, according to an example implementation of the present subject matter.
Figure 2B:
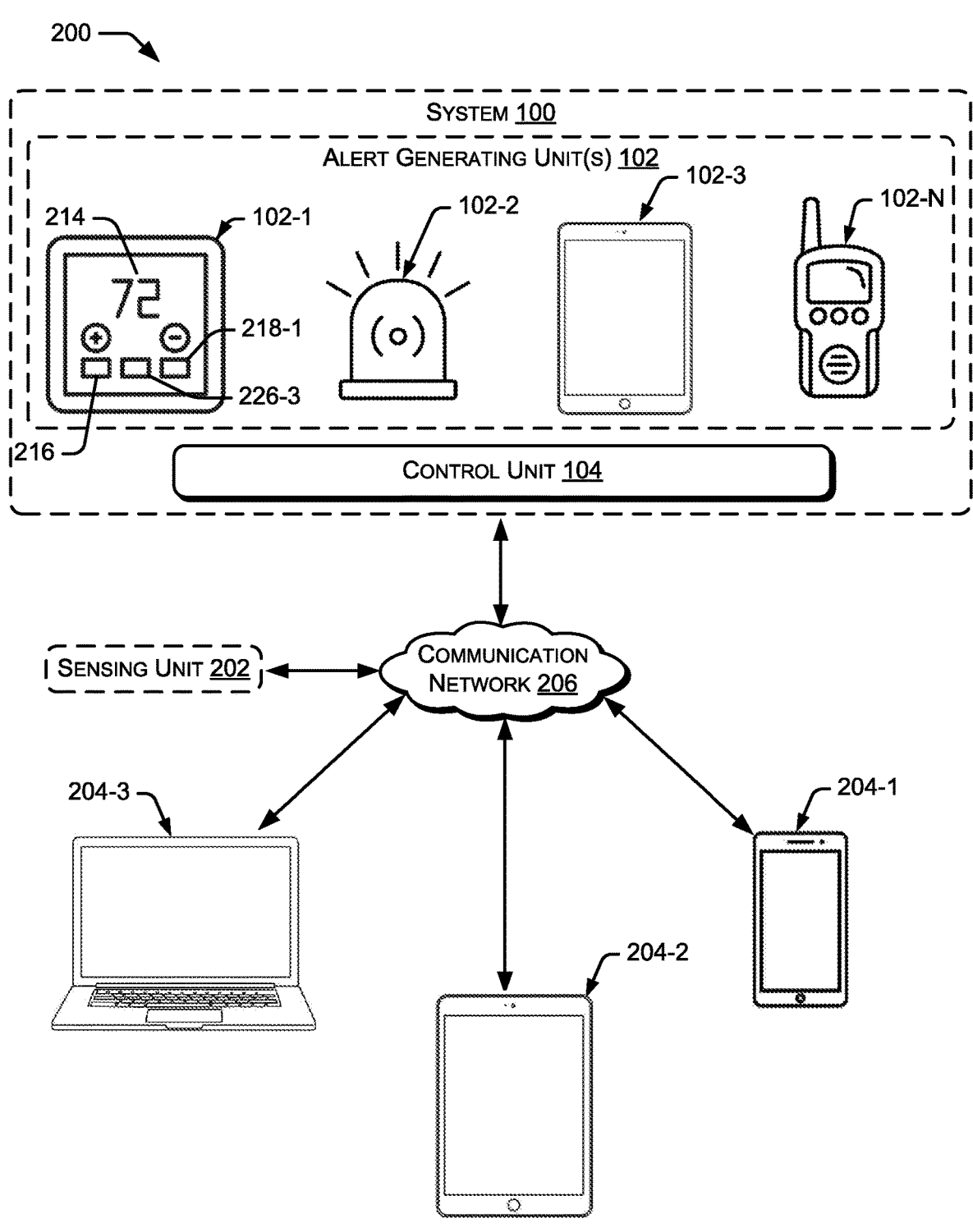
Figure 2C:
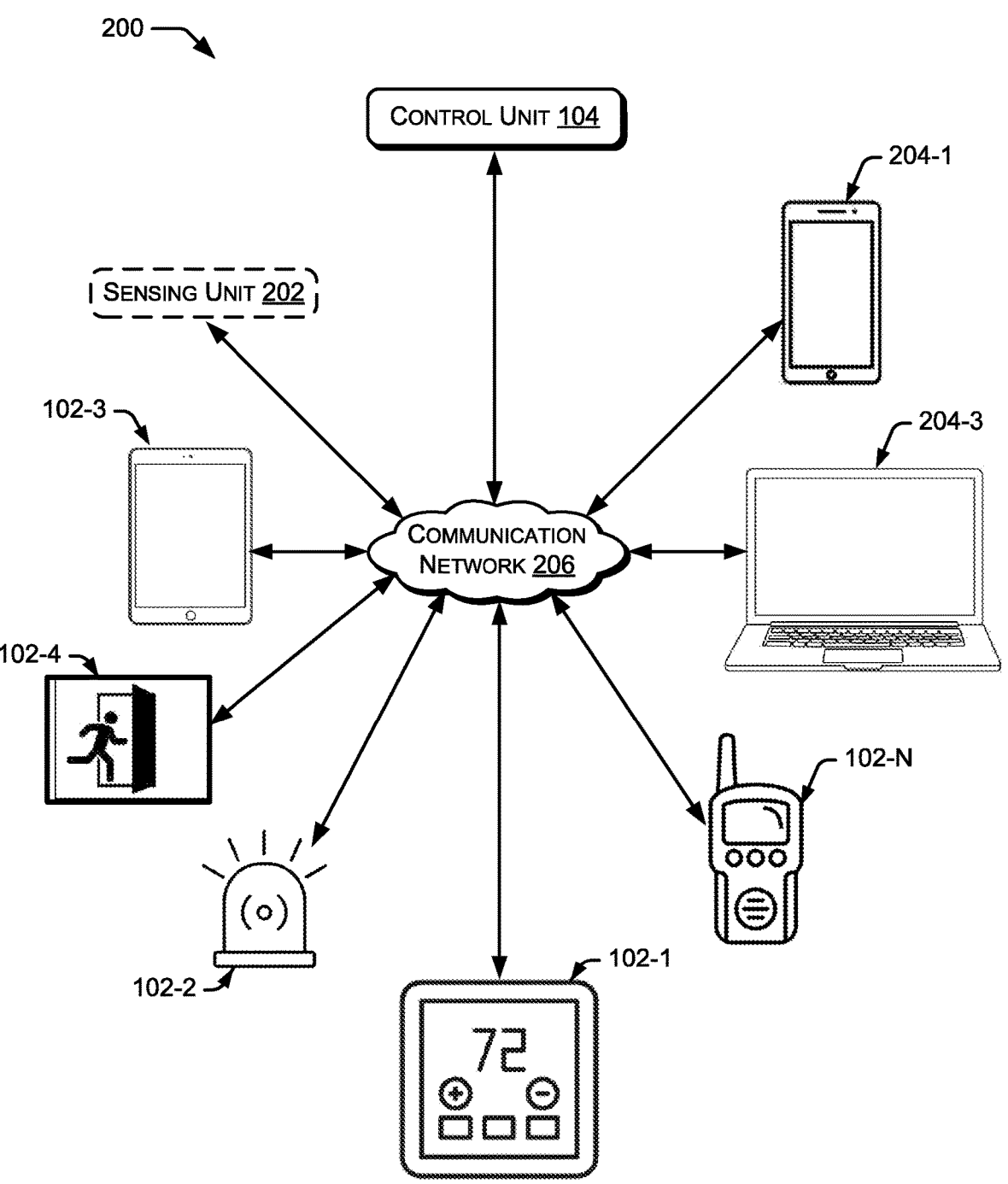

As illustrated in FIGS. 2A and 2B, the system 100 may be located within the premises. In another example, the system 100 may be located outside the premises and communicably coupled with the sensing unit 202 and the user device(s) 204 over the communication network 206. In yet another example, the system 100 may be a distributed computing system having one or more components geographically distributed at same or different locations. For instance, the control unit 104 and the plurality of alert generating units 102 may be communicably coupled with each other over the communication network 206, as exemplarily illustrated in FIGS. 2C and 2D. The one or more components of the system 100, in another example, may be hosted virtually. For example, the control unit 104 may be a virtual processing engine hosted on a cloud-based platform or a remote server.

Further, as exemplarily illustrated in FIGS. 2A-2D, the system 100 may be communicably coupled with the sensing unit 202, and the user device(s) 204 over the communication network 206. In one example, the sensing unit 202 may generate sensor data indicating occurrence of the events within the premises. In one example, the sensing unit 202 may include one or more sensor(s) 226 and a sensor communication module 228. The one or more sensor(s) 226 may be located, in one example, at different locations within the premises and may generate the sensor data based on sensing acts and incidences, for instance the events, occurring within the premises. In one example, the sensor(s) 226 may continuously operate to sense activities and incidences in their vicinity and accordingly generate the sensor data. In another example, the sensor data may be generated at predefined time intervals. For instance, the sensor(s) 226 may sense environmental conditions around their location at predefined time intervals.

As exemplarily illustrated in FIGS. 3A-3D, the one or more sensor(s) 226 may be located at different locations within the premises. In one example, as illustrated in FIG. 3A, the premises 300 may include the vibration sensor, such as a vibration sensor 226-1, embedded within a door 308. In another example, the vibration sensor 226-1 may be embedded within a doorbell (not shown in the figures) associated with the door 308. Similarly, the vibration sensor 226-1 may be located on one or multiple doors located in the premises 302-306, as exemplarily illustrated in FIGS. 3B-3C. The above illustrated examples of location of the vibration sensor 226-1 are illustrative. Other locations for placement of the vibration sensor 226-1 may also be possible. For example, the vibration sensor 226-1 may be embedded within a doorknob or frame of the door 308. Apart for the doors, the vibration sensor 226-1 may be placed at any location within the premises to sense vibrations. In one example, the vibration sensor 226-1 may be used to sense reception of force, for instance, on the door 308 and accordingly generate vibration data. Examples of the vibration sensor 226-1 may include, but are not limited to, piezoelectric sensors, accelerometers, and laser displacement sensors.

Further, in one example, the premises may include the smoke detector to detect presence of smoke within the premises. As exemplarily illustrated in FIG. 3A, the premises 300 may include the smoke detector, such as a smoke detector 226-2, on a ceiling within the premises 300. Similarly, the smoke detector 226-2 may be provided in different premises, as exemplarily illustrated in FIGS. 3B-3D. In one example, the smoke detector 226-2 may generate smoke data indicating presence of smoke within the premises. Examples of the smoke detector 226-2 may include, but are not limited to, a photoelectric or optical smoke detector and an ionization smoke detector.

Figure 2D:
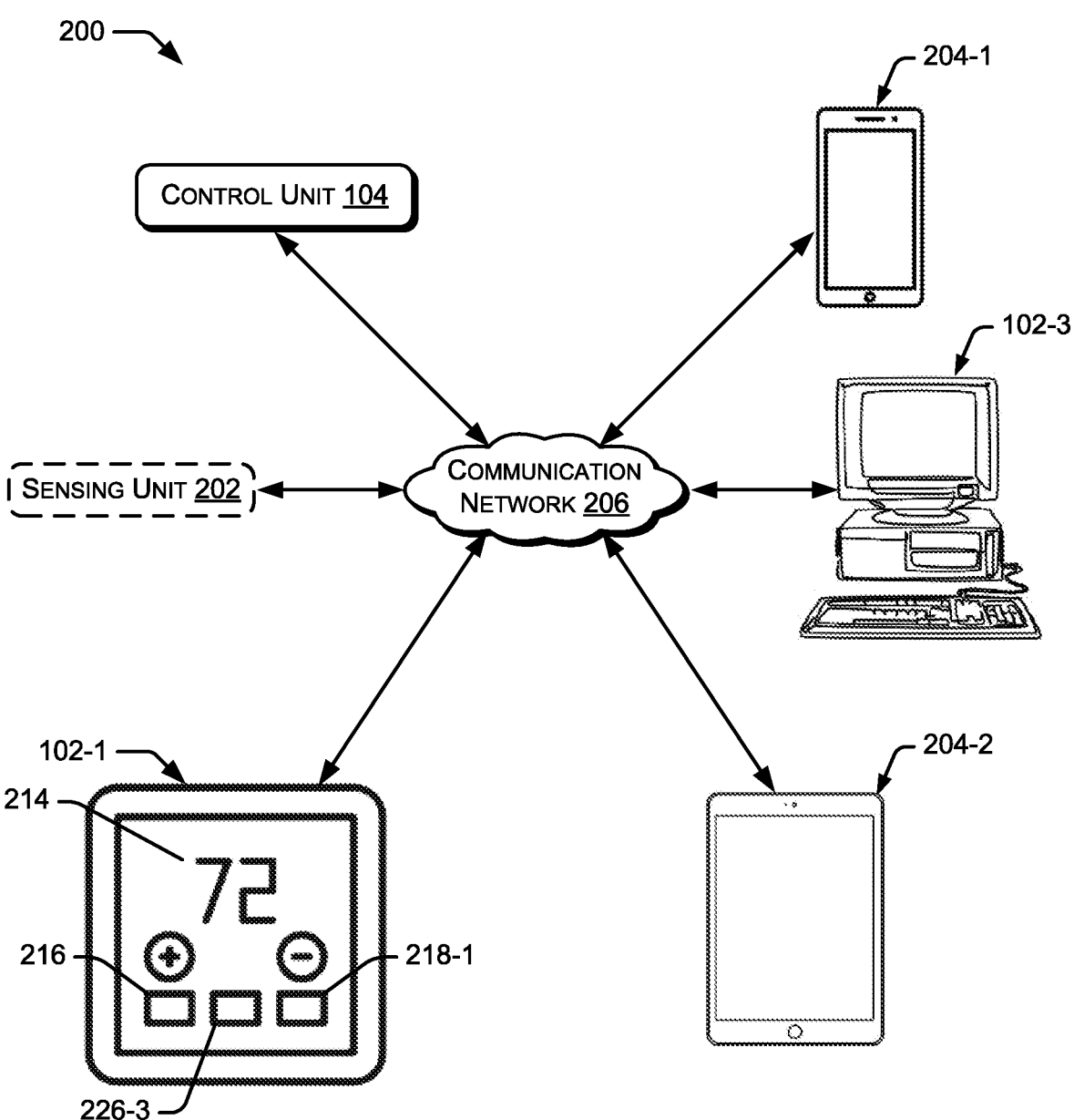

Further, in one example, the premises may include the microphone to capture one or more voice commands from the occupant within the premises and generate voice data. The voice data may thus be indicative of received voice commands. The microphone may be located at different locations within the premises. In one example, the microphone, such as a microphone 226-3, may be located proximate to the door 308 in the premises 300, as illustrated in FIG. 3A. In another example, the microphone 226-3 may be embedded within one of the alert generating units 102. For instance, the microphone 226-3 may be embedded within the thermostat 102-1, as illustrated in FIGS. 2B and 2D.

Thus, based on the sensing, the one or more sensor(s) 226 may generate the sensor data. In one example, the sensor(s) 226 may communicate the sensor data to the sensor communication module 228. The sensor communication module 228 may enable the sensing unit 202 to communicate with other components of the computing environment 200, for instance with control unit 104, over the communication network 206. In one example, the sensor(s) 226 may communicate the sensor data to the control unit 104 over the communication network 206. In case of sensor(s), such as the microphone 226-3 located within the alert generating unit 102, the sensor data may be communicated to the control unit 104 using the communication module of the alert generating units 102. For example, the voice data generated by the microphone 226-3 may be shared with the control unit 104 using the first communication module 208 of the first alert generating unit 102-1.

In one example, the sensor communication module 228 may be a wireless communication module. Examples of the sensor communication module 228 may include, but are not limited to, Arduino modules, Global System for Mobile communication (GSM) module, a Code-division multiple access (CDMA) module, Bluetooth modules, network interface cards (NIC), Wi-Fi modules, dial-up modules, Integrated Services Digital Network (ISDN) modules, Digital Subscriber Line (DSL) modules, ESP8266 modules, and cable modules.

Further, the user device(s) 204 may be communicably coupled with the system 100 over the communication network 206, as exemplarily illustrated in FIGS. 2A-2D. Examples of the user device(s) 204 may include, but are not limited to, a mobile phone, a laptop, a tablet, and a personal digital assistant (PDA). In one example, the user device(s) 204 may include a first user device 204-1, a second user device 204-2, a third user device 204-3, . . . , a M$^{th}$ user device 204-M, where M is a natural number. As exemplarily illustrated in FIGS. 2B-2D, the first user device 204-1 may be the mobile phone, the second user device 204-2 may be the tablet, the third user device 204-3 may be the laptop, and the M$^{th}$ user device 204-M may be the PDA (not shown). The first user device 204-1, the second user device 204-2, the third user device 204-3, . . . , and the M$^{th}$ user device 204-M may hereinafter and interchangeably be referred to as the user devices 204 and individually be referred to as the user device 204.

In one example, each of the user devices 204 may include at least one of an user communication module, a user application, a user device display, and other device module(s). For instance, the first user device 204-1 may include a first user communication module 230, a first user application 232, a first user device display 234, and first other device module(s) 236.

In one example, the user communication module may enable the user device 204 to communicate with the system 100 over the communication network 206. For instance, the user communication module may enable the user device 204 to exchange data and signals with the control unit 104 over the communication network 206. In one example, the user communication module may be a wireless communication module. Examples of the user communication module may include, but are not limited to, Arduino modules, Global System for Mobile communication (GSM) module, a Code-division multiple access (CDMA) module, Bluetooth modules, network interface cards (NIC), Wi-Fi modules, dial-up modules, Integrated Services Digital Network (ISDN) modules, Digital Subscriber Line (DSL) modules, ESP8266 modules, and cable modules.

The user application may be, in one example, a software application installed on the user device 204 to interface with the system 100. In another example, the user application may be a web-based application that may enable the user device 204 to interface with the system 100. In one example, the user application may act as an interface between the control unit 104 and the user device 204 and may communicably connect the control unit 104 and the user device 204 to enable exchange of data and signals. The user application may further enable the user device 204 to render the one or more alerts, including the audio indicators and the one or more visual indicators. For example, the user application may render the one or more alerts using the user device display and the other device module(s).

In one example, the user device display may be communicably coupled with the user application and may be capable of rendering the one or more visual alerts. Examples of the user device display may include, but are not limited to, a liquid crystal display (LCD), an LED display, a thin film transistor (TFT) display, Organic Light Emitting Diode (OLED) display, Active-matrix organic light-emitting diode (AMOLED) display, a capacitive touch screen, an in-plane switching (IPS) LCD display, and a module comprising one or more seven segment LEDs.

Further, the other device module(s) may include an audio alert device, a device processor, and a device memory. In one example, the audio indicators may be rendered via the audio alert device. In one example, the user application may control rendering of the audio alerts on the user device 204. Examples of the audio alert device may include, but are not limited to, a buzzer and one or more speakers.

Further, in one example, the device processor may be an on-board processor of the user device 204 and may control operations and functions of the user device 204. For instance, the device processor may control operation and functioning of the user communication module, the user application, the user device display, the audio alert device, and the device memory. In one example, the device processor may control operations and functions based on computer readable instructions stored in the device memory. The device processor may be, for example, a single dedicated processor, a single shared processor, or a plurality of individual processors, some of which may be shared. Other examples of the device processor may include, but are not limited to, microprocessors, microcomputers, microcontrollers, field programmable gate array (FPGA), digital signal processors (DSPs), central processing units, state machines, logic circuitries, and/or any other devices that manipulate signals and data based on computer-readable instructions.

Further, the device memory may store, in one example, one or more computer-readable instructions, that may be fetched and executed by the device processor to control operations and functions of the user device 204. In one example, the device memory may further store data associated with the user device 204. For example, the device memory may store at least one of Internet Protocol (IP) address, Media Access Control (MAC) Address, International Mobile Equipment Identity (IMEI), Wi-Fi address, Bluetooth address, and a serial number of the user device 204. In one example, the device memory may also store user data that may include information associated with the user of the user device 204. The device memory may include any non-transitory computer-readable medium including, for example, volatile memory such as Random Access Memory (RAM), or non-volatile memory such as Erasable Programmable Read-only Memory (EPROM), flash memory, and the like.

For the sake of brevity, the user communication module, the user application, the user display device, and the other device module(s) have been illustrated for first user device 204-1 only. However, it would be understood that other user devices 204, as illustrated in FIGS. 2A-2D, may also have similar sub-components as the first user device 204-1.

In one exemplary operation, the system 100 may be configured to detect occurrences of the plurality of events and, based on the event, manage rendering of the alerts. In one example implementation, occurrence of the event may be ascertained based on the sensor data. In one example, the sensing unit 202 may generate the sensor data. For instance, as discussed above, the vibration sensor 226-1 may generate the vibration data, the smoke detector 226-2 may generate the smoke data, and the microphone 226-3 may generate the voice data.

In one example, the vibration sensor 226-1 embedded inside the door, such as the door 308, may sense reception of force on the door 308. The force may be, for instance, due to pushing of the door 308 or receiving one or more knocks on the door 308. In another example, the vibration sensor 226-1 embedded within the doorbell may sense pressing of the button, or ringing, of the doorbell. Based on its sensing, the vibration sensor 226-1 may generate the vibration data. In one example, if the vibration sensor 226-1 is a piezoelectric sensor, output of the piezoelectric sensor may change on receiving force, thus indicating reception of force on the door. For instance, on experiencing force, output voltage of the vibration sensor 226-1 may change. The vibration data may thus be indicative of at least one of reception of the push, one or more knocks on the door, and ringing of the doorbell.

In one example, the smoke detector 226-2 may generate smoke data indicating presence of smoke within the premises. For example, in case of the photoelectric or optical smoke detectors, presence of smoke may be detected based on change in intensity of light. The photoelectric or optical smoke detectors may include an in-built source of light, a lens, and a photoelectric receiver. In presence of smoke, intensity of the received light tends to reduce due to scattering from particles of smoke. Thus, the intensity of light may change and the smoke detector 226-2 may generate smoke data indicating such change. The smoke data may thus be indicative of a potential presence of smoke within the premises 300.

Further, in one example, the premises may include the microphone to capture one or more voice commands from the occupant within the premises. The microphone 226-3 may receive the one or more voice commands from the occupant and accordingly generate the voice data. The voice data may thus be indicative of received voice commands.

Thus, based on the sensing, the sensor(s) 226 may generate the sensor data. As described above, the sensor data may include at least one of the vibration data, the smoke data, and the voice data. The sensor data may be provided to the control unit 104. In one example, the sensing unit 202 may communicate the sensor data, over the communication network 206, to the control unit 104.

The control unit 104 may process the sensor data to ascertain occurrence, within the premises, of an event from among the plurality of events. In one example, the control unit 104 may determine if the sensor data is one of the vibration data, the smoke data, and the voice data. In one example, the determination may be made based on an identification data present in the sensor data. In one example, the sensor data may include unique labels. In one example, the sensor data may also include an identification data to classify the sensor data, i.e., whether the sensor data is the vibration data, the smoke data, or the voice data. In one example, the identification data may be prefixed with the sensor data generated by the sensor(s) 226. For instance, the vibration data may include a prefixed vibration identification data to indicate that the sensor data may be the vibration data that may have been generated by the vibration sensor 226-1. Similarly, the smoke data may include a prefixed smoke identification data to indicate that sensor data may be the smoke data that may have been generated by the smoke sensor 226-2. The voice data may also include a prefixed voice identification data to indicate that sensor data may be the voice data that may have been generated by the microphone 226-3. For instance, if the control unit 104 determines that the sensor data includes the vibration identification data, the control unit 104 may classify the sensor data as the vibration data. Similarly, the control unit 104 may be able to classify the sensor data as the smoke data and the voice data.

In another example, as the control unit 104 may be communicably coupled with the sensing unit 202, the control unit 104 may classify the sensor data based on the source that generated the sensor data. For example, if the sensor data was received from the vibration sensor 226-1, the control unit may classify the sensor data to be the vibration data. Similarly, the control unit 104 may be able to classify the sensor data as the smoke data and the voice data. In one example, each of the sensor(s) 226 may be assigned with a unique identifier. The sensor data being generated by each of the sensor(s) 226 may include the unique identifier, thus indicating the source, i.e., the sensor, generating the sensor data. The control unit 104 may thus be able to determine the source of sensor data and accordingly classify the sensor data.

In one example, based on the unique identification number, the control unit 104 may also be able to determine whether source of the sensor data is a correct or authentic source. In one example, the control unit 104 may store a list of authorized sensors in the memory 224. The list may include unique identifiers associated with each of the sensor(s) 226. On receiving the sensor data, the control unit 104 may determine whether the sensor data includes a unique identifier indicating a sensor, from among the sensor(s) 226, to be the source of the sensor data. If it is determined that the source is not a sensor from among the sensor(s) 226, the control unit 104 may ascertain that the source of the sensor data is not authentic and may not proceed with process of determining the event. In one example, the control unit 104 may proceed with receiving the sensor data from the sensor(s) 226, as discussed above. However, if it is determined that the source is a sensor from among the sensor(s) 226, the control unit 104 may ascertain that the source of the sensor data is authentic and may proceed with process of determining the event.

In one example, based on classification of the sensor data, the control unit 104 may determine an event, from among the plurality of events, occurring within the premises. For instance, if the control unit 104 determines the sensor data to be the vibration data, indicating reception of at least one of the push, the one or more knocks on the door 308, and ringing of the doorbell, the control unit 104 may ascertain that the door, such as the door 308 of the premises 300, may have experienced force. The control unit 104 may thus ascertain occurrence of the door interaction event.

In another one example, to ascertain occurrence of the door interaction event, the control unit 104 may further process the vibration data. In one example, the vibration data may indicate, for instance, output voltage from the piezo-electric sensor. The control unit 104 may compare the output voltage with a predefined first threshold voltage. In one example, the predefined first threshold voltage may indicate a minimum output voltage value required to be generated by the piezoelectric sensor for ascertaining actual and considerable reception of force on the door. If the output voltage is determined to be more than the first threshold voltage, the control unit 104 may determine that the door may have actually experienced the force. The control unit 104 may thus ascertain occurrence of the door interaction event. However, if the control unit 104 determines the output voltage to be less than the first threshold voltage, the control unit 104 may confirm that the door interaction event has not occurred. Thus, situations where the door may experience minor or accidental forces, for instance due to accidental touch by a user passing by the door or due to wind, may not result in a false determination of the door interaction event.

Further, in one example, to ascertain occurrence of the smoke detection event, the control unit 104 may determine if the sensor data is the smoke data, as discussed above. If the control unit 104 determines the sensor data to be the smoke data, indicating detection of smoke inside the premises, the control unit 104 may ascertain that the smoke detection event has either occurred or is still occurring.

Further, in one example, to ascertain occurrence of the voice assistance event, the control unit 104 may determine if the sensor data is the voice data, as discussed above. If the control unit 104 determines the sensor data to be the voice data, the control unit 104 may ascertain that the microphone 226-3 may have received a voice command from the user, or the occupant, located within the premises. The control unit 104 may thus ascertain occurrence of the voice assistance event. In one example, the voice commands may be provided by the occupant to convey a message to another user. In another example, the voice command may be provided by an occupant of a room, such as the room located within the hotel 306, to staff of the hotel 306. The voice command may be for requesting the staff to perform any desired service.

Few non-limiting examples of the voice commands may include voice commands for requesting water, towel, dental kit, or asking any query.

In another example, the control unit 104 may further process the voice data to ascertain occurrence of the voice assistance event. For instance, the control unit 104 may process the voice data, in one example, to obtain a machine understandable data. In one example, the processing engine 220 of the control unit 104 may perform Natural Language Processing (NLP) to analyse and synthesize the voice data to obtain machine understandable data. The control unit 104 may thus be able to understand human language, i.e., the voice command. In one example, the control unit 104 may also be capable of analysing and synthesizing voice commands given in different languages. For instance, the processing engine 220 may be capable of identifying a language in which the occupant is providing the voice command. Based on the identified language, the processing engine may use known language conversion techniques to convert the voice commands into a voice command of default language. After converting language of the voice command, the processing engine 220 may obtain the machine understandable data from the voice command. The control unit 104 may thus be capable of interpreting the voice commands provided in different languages, therefore being capable of catering to all occupants irrespective of the language spoken by the occupant.

The control unit 104 may thus ascertain occurrence of the event, from among the plurality of events, based on the sensor data. Based on the event, the control unit 104 may identify a set of visual indicators, from the one or more visual indicators, to be rendered for indicating occurrence of the event. The one or more visual indicators may include graphical alerts, for example, text messages, symbolic alerts, one or more images, blinking of an LED, emission of light of a specific color by the LED, and changing blinking pattern of the LED.

In one example, multiple sets of visual indicators may be derived by forming different combinations of the visual indicators. Further, each set of visual indicators may be associated with different events. For example, a first set, a second set, and a third set of visual indicators may be derived from the one or more visual indicators and may be associated with the door interaction event, the smoke detection event, and the voice assistance event, respectively. In one example, the memory 224 of the control unit 104 may store a mapping indicating association of the set of visual indicators with respective events.

In one example implementation, upon determining the event to be the door interaction event, the control unit 104 may identify the first set of visual indicators associated with the door interaction event, as the set of visual indicators. The first set of visual indicators may include the one or more of the visual indicators. For instance, the first set of visual indicators may include at least one of an image indicating occurrence of the door interaction event, a patterned blinking of the LED, and a text message indicating occurrence of the door interaction event. In one example, the image may be an image of a door to indicate presence of someone on door and may be rendered on any of the alert generating units 102, say the first alert generating unit 102-1. Further, in one example, the patterned blinking may be repeated activation of the LED device for a predefined period of time. For example, the LED device, say the first LED device 216-1, may be repeatedly activated or turned from ON to OFF for 10 seconds, after a predefined period of time, say 2 seconds, to receive attention of the occupant and indicate occurrence of the door interaction event. The text message, in one example, may be "Someone on Door" to indicate the occupant about possible presence of someone on the door.

In one example, upon determining the event to be the smoke detection event, the control unit 104 may identify the second set of visual indicators associated with the smoke detection event, as the set of visual indicators. The second set of visual indicators may include at least one of an image indicating occurrence of the smoke detection event, initiate emission of light of any specific color by the LED, and a text message indicating occurrence of the smoke interaction event. In one example, the image may be a symbolic representation of smoke or fire to indicate occurrence of the smoke detection event and may be rendered on any of the alert generating units 102, say the first alert generating unit 102-1 and/or the third alert generating unit 102-3. Further, in one example, the LED device, such as the LED device 216-1 and/or the smart bulb 102-2, may initiate emission of light of light of any specific color, say red color. The text message, in one example, maybe "FIRE ALERT" to alert the occupant about possible detection of fire and smoke in the premises.

Upon determining the event to be the voice assistance event, the control unit 104 may identify the third set of visual indicators associated with the voice assistance event, as the set of visual indicators. The third set of visual indicators may include at least one of a text message and blinking of the LED. In one example, the text message may be a text message obtained by converting the machine understandable data obtained from the voice data. The machine understandable data may be converted into a human-understandable text message using any of the known techniques. In one example, the NLP may be used for converting the machine understandable data into the human-understandable text message. The text message may thus be a text message converted from the voice command provided by the occupant. In one example, the text message may be identified as the third set of visual indicators and may be rendered on any of the alert generating units 102, say the first and/or the third alert generating units. In one non-limiting example, say the voice command may be a request from an occupant of a room in a hotel to bring water. For instance, the voice command may be "please bring water". The voice command may be converted into a text message and may be rendered on any of the alert generating units 102, say the third alert generating unit 102-3 that, in one example, may be associated with staff of the hotel. The staff may thus be informed about occurrence of the voice assistance event.

The above examples are for illustrative purposes only. In one example implementation, different set of visual indicators may be used for indicating occurrence of different events.

In one example implementation, the audio indicators may also be identified in addition to the visual indicators. In one example, based on the event, different audio indicators may be identified. For instance, a buzzer sound may be identified as a first audio indicator to be rendered on occurrence of the door interaction event, an alarm may be identified as a second audio indicator to be rendered on occurrence of the smoke detection event, and a soft music may be identified as a third audio indicator to be rendered on occurrence of the voice assistance event.

Once the set of visual indicators and/or the audio indicators are identified, the control unit 104 may generate an activation signal to render the identified set of visual indicators on at least one alert generating unit 102, from among the plurality of alert generating units 102. In one example, the activation signal may be a command generated by the processing engine 220 to instruct at least one of the alert generating units 102 to render the identified set of visual indicators. In one example, the activation signal may include instructions indicating identification of the set of visual indicators to be rendered and an address of at least one alert generating unit 102, from among the alert generating units 102, for rendering the identified set of visual indictors. In one example, the memory 224 may store a mapping table indicating a correlation between each of the alert generating units 102 and their addresses. The addresses may be, for example, MAC address or the IP address of the alert generating unit 102.

In one example, the activation signal may also include a set of audio indicators. For instance, in case of the door interaction event, the activation signal may also include instructions for rendering the first audio indicator on the alert generating unit 102. On ascertaining the event to be the smoke detection event, the activation signal may also include instructions for rendering the second audio indicator on the alert generating unit 102. Also, on ascertaining the event to be the voice detection event, the activation signal may also include instructions for rendering the third audio indicator on the alert generating unit 102.

Thus, upon identifying at least one of the audio indicators and the set of visual indicators, the activation signal may be generated and transmitted to one or more of the alert generating units 102. In one example, the sets of visual indicators may also be rendered on two or more alert generating units 102. In one example, on ascertaining the event as the door interaction event, the control unit 104 may generate the activation signal including instructions that may indicate that the first set of visual indicators are to be rendered on the first alert generating unit 102-1 and/or the second alert generating unit 102-2. Similarly, on ascertaining the event as the smoke detection event, the control unit 104 may generate the activation signal including instructions that may indicate that the second set of visual indicators are to be rendered on the second alert generating unit 102-2. Further, on ascertaining the event as the voice assistance event, the control unit 104 may generate the activation signal including instructions that may indicate that the third set of visual indicators are to be rendered on the third alert generating unit 102-3.

The activation signal may then be transmitted to at least one alert generating unit 102 for rendering the set of visual indicators. In one example, the activation signal may be transmitted by the controller communication module 222 of the control unit to the communication module of the alert generating unit 102 over the communication network 206. For instance, the activation signal may be transmitted to the communication module of the alert generating unit 102 having the address as included in the activation signal. For example, if the activation signal includes address of the first alert generating unit 102-1, the activation signal may be transmitted to the communication module of the first alert generating unit 102-1. Similarly, if the activation signal includes address of the second alert generating unit 102-2, the activation signal may be transmitted to the communication module of the second alert generating unit 102-2. Further, if the activation signal includes address of the fourth alert generating unit 102-4, the activation signal may be transmitted to the communication module of the fourth alert generating unit 102-4. Also, if the activation signal includes address of the $N^{th}$ alert generating unit 102-N, the activation signal may be transmitted to the communication module of the $N^{th}$ alert generating unit 102-N.

In one example, any of the alert generating unit 102 may be selected for rendering the set of visual indicators, and the audio indicators. In one example, selection of the alert generating unit 102 may depend on severity of the event. For instance, in case of smoke detection event more than one alert generating units 102 may be selected for rendering of the audio and the visual indicators.

In another example, selection of the alert generating unit 102 may depend on an operational state of the at least one alert generating unit 102. In one example, the operational state may be an active state and a passive state. The active state may indicate, for instance, that the at least one alert generating unit 102 may be functionally operative, whereas the passive state may indicate that the at least one alert generating unit 102 may be functionally inoperative. The operational state may be determined based on state data received from the alert generating units 102. In one example, the alert generating units 102 may generate and share the state data, continuously or at predefined time intervals, indicating their operational state with the control unit 104. The state data may be indicative of, for example, interactions with input/output interfaces of the alert generating units 102 or information from the alert generating unit's firmware or Application Programming Interfaces (APIs) indicating whether the alert generating units 102 are operating actively or passively. The state data may be processed by the control unit 104 to ascertain whether an alert generating unit, from among the alert generating units 102, is in the active or passive state. For example, the control unit 104 may process the state data to determine whether the state data indicates fulfilment of any predefined threshold criteria related to the operational state. If the threshold criteria is fulfilled by the state data, the control unit 104 may ascertain the operational state to be the active state. However, if the threshold criteria is not fulfilled, the control unit 104 may ascertain the operational state to be the passive state.

In another example, the operational state may be determined based on response received from the alert generating units 102. The control unit 104 may, in one example, send a state determination signal to each of the alert generating units 102 to enquire about the operational state. In one example, the state determination signal may be sent at predefined time intervals. On receiving the state determination signal, each of the alert generating units 102 may generate and share a response, for example, an acknowledgement with the control unit 104. On receiving the acknowledgement from each of the alert generating units 102, the control unit 104 may ascertain that the alert generating units 102 are actively responding or are functionally operative, and may thus be in the active state. However, in case an acknowledgement is not received from one or more alert generating units 102, the control unit may re-send the state determination signal to such alert generating units 102 for a predefined number of times. If the acknowledgement is still not received, the control unit 104 may ascertain such alert generating units 102 to be functionally inoperative, and may thus be in the passive state.

On determining the operational state of the at least one alert generating unit 102, say the alert generating unit 102-1, to be the active state, the activation signal may be transmitted to that alert generating unit 102-1. However, on determining the operational state to be passive state, another alert generating unit 102, say the alert generating unit 102-2, having the operational state as the active state may be identified and the activation signal may be transmitted to the alert generating unit 102-2.

Based on the activation signal, the alert generating unit(s) 102 may render the alerts, including the audio indicators and the set of visual indicators. For instance, say the activation signal is transmitted to the first alert generating unit 102-1. The first communication module 208 may receive the activation signal. Subsequently, the first indication device 212 may render the alerts, including at least one of the audio indicators and the visual indicators. In one example, the first display device 214, the first LED device 216, and the other module(s) 218 may render the set of visual indicators and the audio indicators. In one example, the first processor 210 may communicate with the first display device 214 to render the image indicating occurrence of the door interaction event. The image may be, for example, a digital image indicating "Someone at door" may be rendered. In another example, a patterned blinking of the LED device 216 may be initiated.

Since the first alert generating unit 102-1 may be located within the premises, as illustrated in exemplary FIGS. 3A-3D, the occupant present within the premises may be able to perceive the first set of visual indicators being rendered by the first alert generating unit 102-1. The occupant may thus be made aware of the door interaction event.

Further, on ascertaining occurrence of the smoke detection event, the activation signal may be provided to, in one example, the second alert generating unit 102-2 to render the second set of visual indicators. In one example, the activation signal may also be provided to another device, such as the walkie talkie 102-4 associated with the emergency services.

Similarly, on ascertaining occurrence of the voice assistance event, the activation signal may be provided to, in one example, any of the alert generating units, say the third alert generating unit 102-3 to render the third set of visual indicators. In one example, on ascertaining the voice assistance event, the activation signal, comprising the text message obtained from the voice data, may also be provided to another user device. For example, the activation signal may be provided to a tablet 102-3 that may be associated with the staff of the hotel to indicate the voice command to staff of the hotel.

The above discussed examples are illustrative and non-limiting. The set of visual indicators, optionally along with audio indicators, may be rendered by any of the alert generating units 102, illustrated in FIGS. 2A-3D, that may receive the activation signal. In one example, the set of visual indicators, optionally along with audio indicators, may also be rendered by two or more alert generating units 102 on receiving the activation signal, In one example implementation, the activation signal may also be provided to the user device(s) 204. In one example, the control unit 104 may identify at least one user device 204 that may be communicably coupled with the control unit 104. In one example, the user device(s) 204 may be communicably coupled with the control unit using the user application. As previously discussed, the user application may act as an interface between the control unit 104 and the user device 204 and may communicably connect the control unit 104 and the user device 204 to enable exchange of data and signals.

In one example, when the user application may be executed for the first time on the user device(s) 204, the user device(s) 204 may establish a connection with the control unit 104. The user application may be initiated, at least once, for being communicably coupled with the control unit 104. In one example, the connection may be established over the communication network 206 that may include an access point, for instance a router, that may be located within the premises. As the user device(s) 204 may connect with the router to connect with the control unit 104, via the user application, the data associated with the user device(s) 204 may be shared with the router and the control unit 104. The control unit 104 may thus notice receiving of the data associated with the user device(s) 204 from the router. Also, during communication, data associated with the router, such as IP address and MAC address, and device identification (ID), may be shared with the control unit 104. The control unit 104 may thus receive data associated with the user device(s) 204 and the router located within the premises.

In one example, the control unit 104 may store a mapping table indicating an association between the premises and the router. For instance, the mapping may be stored within the memory 224. Further, in one example, each premises, such as the premises 300-306, may have a premises identity (ID), for example, address, room number, and a unique ID. The mapping may thus include the premises ID and may associate the router with the premises ID. Therefore, the mapping table may indicate an association between the premises and the router located within the premises. The control unit 104 may thus be able to associate the user device(s) 204 with the premises based on the router from which the data associated with the user device(s) 204 was received. Therefore, on ascertaining occurrence of the events within the premises, the control unit 104 may be able to identify the user device(s) 204 associated with the premises.

The control unit 104 may thus share the activation signal with the user device(s) 204. In one example, the activation signal may be shared over the communication network 206 and may be received by the user communication module of the used device(s) 204. The user communication module may share the activation signal with the user application. Based on the activation signal, the user application may enable rendering of the alerts, including the audio indicators and the visual indicators, on the user device(s) 204. For example, user application may enable rendering of the first set of audio and visual indicators on the user device(s) 204, such as the mobile phone 204-1, on occurrence of the door interaction event. Similarly, different sets of audio and visual indicators may be rendered on different user device(s) 204, as exemplarily illustrated in FIGS. 2A-2C.

Since the user device(s) 204 may be communicably coupled with the control unit 104, over the communication network 206, the user device(s) 204 may be able to receive the activation signal even when the user device(s) 204 may not be located within the premises. The user device(s) 204 may thus be able to render the set of audio and visual indicators and the occupant associated with the user device(s) 204 may be able to receive indications about occurrence of the events.

FIG. 3D illustrates an exemplary illustration where the user device 204-1 may be located outside the premises 306 and may render the set of audio and visual indicators to alert occupant of occurrence of an event, such as the door interaction event, within the premises 306. Similarly, on occurrence of different events, the user device(s) 204 may be able to receive the activation signal and render the set of audio and visual indicators. The user, or the occupant, may thus be notified of occurrence of the events irrespective of the occupant's location. Therefore, the limitations of the existing solutions in providing the alerts may be reduced.

FIGS. 4, 5, 6, 7, and 8 illustrate exemplary methods 400, 500, 600, 700, and 800 respectively, to manage alerts on occurrence of a plurality of events. The order in which the methods are described is not intended to be construed as a limitation, and any number of the described method blocks may be combined in any order to implement the methods, or an alternative method. Furthermore, methods 400, 500, 600, 700, and 800 may be implemented by processing resource or computing device(s) through any suitable hardware, non-transitory machine-readable instructions, or combination thereof.

It may also be understood that methods 400, 500, 600, 700, and 800 may be performed by programmed computing devices, such as the control unit 104, as depicted in FIGS. 1-2D. Furthermore, the methods 400, 500, 600, 700, and 800 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. While the methods 400, 500, 600, 700, and 800 are described below with reference to the control unit 104 and the system 100 as described above; other suitable systems for the execution of these methods may also be utilized. Additionally, implementation of these methods is not limited to such examples.

FIG. 4 illustrates the method 400 for managing alerts, according to an example implementation of the present subject matter. In one example, the alerts may be managed based on occurrence of an event, from among a plurality of events. Examples of the event may include, but are not limited to, a door interaction event, a smoked detection event, and a voice assistance event. In one example, occurrence of the event may be ascertained based on sensor data. On ascertaining occurrence of the event, a set of visual indicators, from one or more visual indicators, may be identified for being rendered on at least one alert generating unit from among the plurality of alert generating units, such as the alert generating units 102. The set of visual indicators may indicate the event occurring within the premises.

At block 402, sensor data indicating occurrence of an event may be generated. In one example, the sensor data may be generated by one or more sensors of a sensing unit, such as the one or more sensors 226 of the sensing unit 202. The sensors may be located at different locations within the premises and may sense different events occurring around their location. For instance, a vibration sensor, such as the vibration sensor 226-1, may sense reception of one or more knocks on a door located inside the premises and interaction with a doorbell associated with the door. A smoke detector, such as the smoke detector 226-2, may detect, in one example, presence of smoke within the premises. Further, a microphone may sense reception of a voice command for one or more users, such as the occupant of the premises. Based on sensing of the different events or triggers, the sensors may generate the sensor data.

At block 404, the sensor data may be provided to a control unit for initiating rendering of one or more visual indicators. In one example, the sensor data may be provided to the control unit, such as the control unit 104. The control unit may analyze the sensor data and may accordingly ascertain initiation of rendering of the one or more visual indicators.

At block 406, a set of visual indicators may be identified for being rendered on the at least one alert generating unit. In one example, the sensor data may be analyzed to ascertain occurrence of the event from among the plurality of events. On ascertaining occurrence of the event, it may be ascertained that rendering of the one or more visual indicators is to be initiated. Based on the event, the set of visual indicators, from among the one or more visual indicators, may be identified for being rendered on the at least one alert generating unit.

At block 408, the set of visual indicators may be rendered by the at least one alert generating unit. In one example, subsequent to identification of the set of visual indicators, an activation signal may be generated to initiate rendering of the set of visual indicators on the at least one alert generating unit. The activation signal may then be transmitted to the at least one alert generating to initiate rendering of the set of visual indicators.

At block 410, the set of visual indicators may be rendered by a user device. In one example, the activation signal may further be transmitted to the user device, such as the user device 204 for rendering the set of visual indicators. On receiving the activation signal, the user device may initiate rendering of the set of visual indicators to indicate occurrence of the event.

Figure 5:
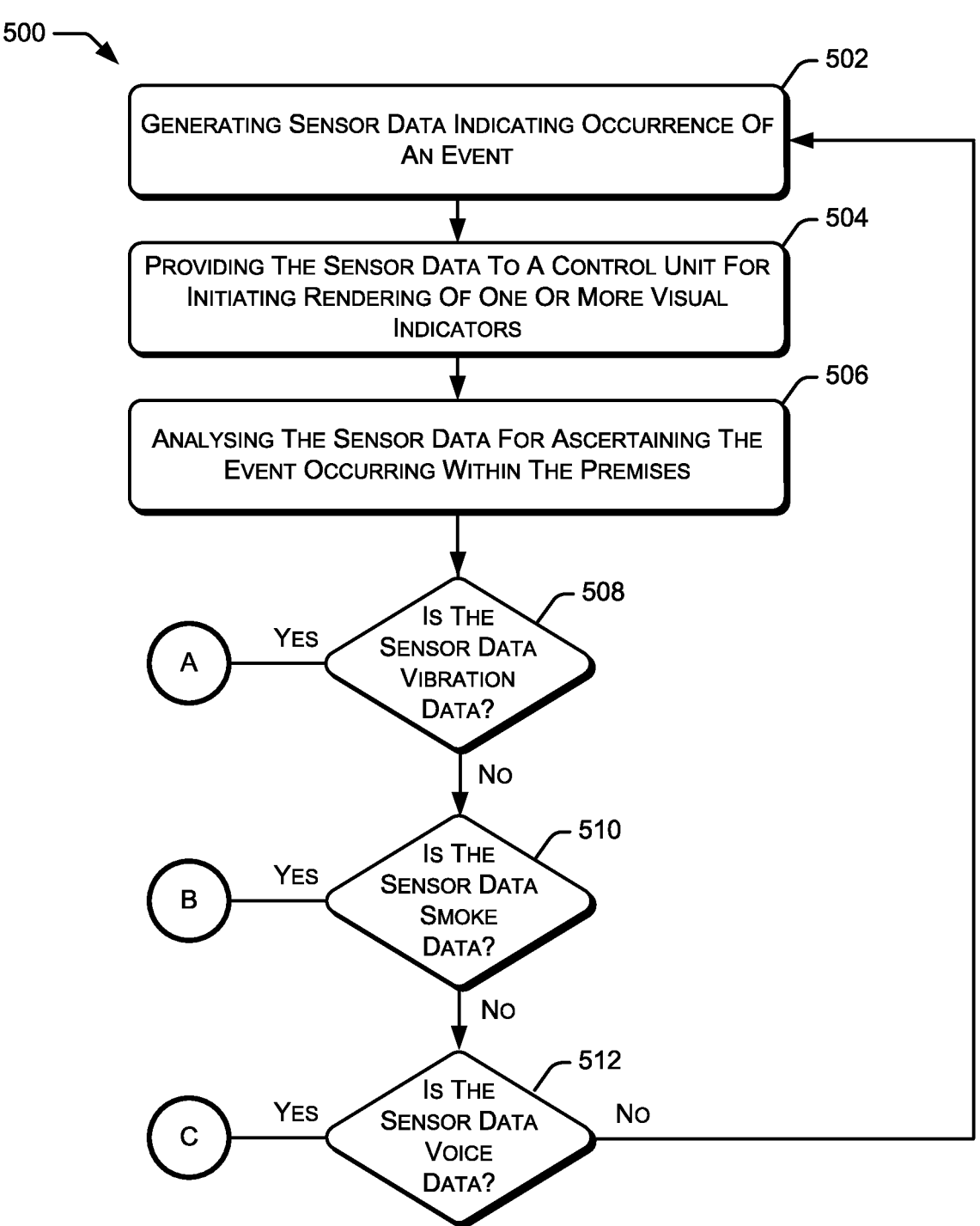
FIG. 5 illustrates a method for managing alerts on occurrence of a plurality of events within a premises, according to an example implementation of the present subject matter.

FIG. 5 illustrates the method 500 for managing alerts on occurrence of a plurality of events within a premises, according to an example implementation of the present subject matter.

At block 502, sensor data indicating occurrence of an event may be generated. In one example, a plurality of sensors, such as the sensors 226, may be distributed within the premises to sense occurrence of an event. In one example, the event may be occurrence of an incident that may require attention of one or more users, for example, occupants of the premises, staff of the premises, and people associated with emergency services. Examples of such events may include, but are not limited to, a door interaction event, a smoke detection event, and a voice assistance event.

In one example, each of the plurality of sensors may be capable of sensing the events occurring around their location. On occurrence of the event, the sensors may accordingly generate the sensor data. For instance, on sensing reception of one or more knocks on a door located inside the premises or interaction with a doorbell associated with the door, a vibration sensor, such as the vibration sensor 226-1, may generate vibration data indicating such reception and interaction. Similarly, on detecting presence of smoke within the premises, a smoke detector, such as the smoke detector 226-2, may generate smoke data indicating presence of smoke. Further, on receiving one or more voice commands for the one or more users, such as the occupants, a microphone, such as the microphone 226-3, may generate voice data indicating reception of the one or more voice commands.

At block 504, the sensor data may be provided to a control unit for initiating rendering of one or more visual indicators. In one example, the sensor data may be provided to the control unit, such as the control unit 104, for analysis and ascertaining initiation of rendering the one or more visual indicators.

At block 506, the sensor data may be analyzed for ascertaining the event occurring within the premises. In one example, the sensor data may be analyzed by the control unit to ascertain the event, from among the plurality of events, occurring within the premises. In one example, for ascertaining the event, the sensor data may be analyzed to determine whether the sensor data is one of the vibration data, the smoke data, and the voice data.

At block 508, it may be determined whether the sensor data is the vibration data. In one example, the determination may be made based on identification data prefixed in the sensor data. For instance, the vibration data may include prefixed vibration identification data to indicate that the sensor data may be the vibration data. Thus, if it is determined that the sensor data includes the vibration identification data, the sensor data may be determined to be the vibration data. The method 500 may then follow the Yes path and proceed to block A.

However, if it is determined that the sensor data is not the vibration data, the method 500 may then follow the No path and proceed to block 510.

At block 510, it may be determined whether the sensor data is the smoke data. In one example, the determination may be made based on the identification data prefixed in the sensor data. For instance, the smoke data may include prefixed smoke identification data to indicate that the sensor data may be the smoke data. Thus, if it is determined that the sensor data includes the smoke identification data, the sensor data may be determined to be the smoke data. The method 500 may then follow the Yes path and proceed to block B.

However, if it is determined that the sensor data is not the smoke data, the method 500 may then follow the No path and proceed to block 512.

At block 512, it may be determined whether the sensor data is the voice data. In one example, the voice data may include prefixed voice identification data to indicate that sensor data may be the voice data. Thus, if it is determined that the sensor data includes the voice identification data, the sensor data may be determined to be the voice data. The method 500 may then follow the Yes path and proceed to block C.

However, if it is determined that the sensor data is not the voice data, the method 500 may then follow the No path and proceed to block 502 where further sensor data may be generated by the sensors.

FIG. 6 illustrates the method 600 for managing alerts on occurrence of a door interaction event, according to an example implementation of the present subject matter. The method 600 continues from the block A of the method 500.

At block 602, the event may be ascertained as the door interaction event. In one example, the door interaction event may indicate reception of one or more knocks on the door located within the premises. In another example, the door interaction event may indicate ringing of a doorbell associated with the door. As the vibration data may indicate, in one example, reception of the knocks or ringing of the doorbell, the vibration data may be indicative of the door interaction event. Thus, on determining the sensor data to be the vibration data, the event may be ascertained as the door interaction event.

At block 604, a first set of visual indicators may be identified for being rendered by the at least one alert generating unit. In one example, a set of visual indicators may be identified, from among the one or more visual indicators, on occurrence of an event and for being rendered on the at least one alert generating unit, from the plurality of alert generating units. Examples of the one or more visual indicators may include, but are not limited to, graphical alerts, text messages, symbolic alerts, one or more images, blinking of an LED, changing color of light being emitted by the LED, and changing blinking pattern of the LED.

On ascertaining occurrence of the event, a set of visual indicators may be formed from among the one or more visual indicators. In one example, on ascertaining the door interaction event, a first set of visual indicators may be identified from among the one or more visual indicators. The first set of visual indicators may include, in one example, at least one of an image indicating occurrence of the door interaction event, a patterned blinking of the LED, and a text message indicating occurrence of the door interaction event.

At block 606, an activation signal may be generated to trigger the at least one alert generating unit for rendering the first set of visual indicators. In one example, the activation signal may be generated by the control unit 104. The activation signal may be, in one example, an instruction indicating the first set of visual indicators to be rendered and an address of at least one alert generating unit 102, from among the alert generating unit 102, for rendering the first set of visual indictors. In one example, the activation signal may include address of a first alert generating unit, such as the first alert generating unit 102-1, for rendering the first set of visual indicator. In one example, the first alert generating unit 102-1 may be a thermostat. In another example, the first alert generating unit 102-1 may be a smart bulb.

At block 608, the activation signal may be transmitted to the at least one alert generating unit. In one example, the activation signal may be transmitted by the control unit 104 to the at least one alert generating unit, say the first alert generating unit 102-1. In one example, the activation signal may be transmitted over a communication network, such as the communication network 206.

At block 610, the first set of visual indicators may be rendered by the at least one alert generating unit. In one example, the at least one alert generating unit, say the first alert generating unit 102-1, may initiate rendering of the first set of visual indicators in response to receiving the activation signal. In one example, the first alert generating unit 102-1 may initiate rendering of at least one of the graphical alerts, text messages, symbolic alerts, one or more images, blinking of an LED, changing color of light being emitted by the LED, and changing blinking pattern of the LED. For instance, the first alert generating unit 102-1 may initiate rendering of at least one of an image indicating occurrence of the door interaction event, a patterned blinking of the LED, and a text message indicating occurrence of the door interaction event.

At block 612, the first set of visual indicators may also be rendered by a user device. In one example, the activation signal may also be transmitted to the user device, such as the user device 204, for rendering the first set of visual indicators to indicate occurrence of the door interaction event.

The above exemplary method 600 has been disclosed with respect to the first alert generating unit and the first set of visual indicators. However, such examples may be of non-limiting nature. Other alert generating units, from among the alert generating units 102, may also be used separately, or along with the first alert generating unit 102-1, for rendering other set of visual indictors, that may be formed from among the one or more visual indicators.

FIG. 7 illustrates the method 700 for managing alerts on occurrence of a smoke detection event, according to an example implementation of the present subject matter. The method 700 continues from the block B of the method 500.

At block 702, the event may be ascertained as the smoke detection event. In one example, the smoke detection event may indicate detection of smoke inside the premises. As the smoke data may indicate, in one example, presence of smoke, the smoke data may be indicative of the smoke detection event. Thus, on determining the sensor data to be the smoke data, the event may be ascertained as the smoke detection event.

At block 704, a second set of visual indicators may be identified for being rendered by the at least one alert generating unit. In one example, the second set of visual indicators may be identified, from among the one or more visual indicators, on occurrence of the smoke detection event and for being rendered on the at least one alert generating unit, from the plurality of alert generating units. In one example, the second set of visual indicators may include, in one example, at least one of an image indicating occurrence of the smoke detection event, changing color of light being emitted by an LED, and a text message indicating occurrence of the smoke interaction event.

At block 706, an activation signal may be generated to trigger the at least one alert generating unit for rendering the second set of visual indicators. In one example, the activation signal may be an instruction indicating the second set of visual indicators to be rendered and an address of at least one alert generating unit 102, from among the alert generating unit 102, for rendering the second set of visual indictors. In one example, the activation signal may include address of, say, a second alert generating unit, such as the second alert generating unit 102-2, for rendering the second set of visual indicators. In one example, the second alert generating unit 102-2 may be a smart bulb. In another example, the second alert generating unit 102-2 may be a tablet computer.

At block 708, the activation signal may be transmitted to the at least one alert generating unit. In one example, the activation signal may be transmitted to, say, the second alert generating unit 102-2.

At block 710, the second set of visual indicators may be rendered by the at least one alert generating unit. In one example, the second alert generating unit 102-2 may initiate rendering of the second set of visual indicators in response to receiving the activation signal. In one example, the second alert generating unit 102-2 may initiate rendering of at least one of the image indicating occurrence of the smoke detection event, changing color of light being emitted by the LED, and the text message indicating occurrence of the smoke interaction event.

At block 712, the second set of visual indicators may also be rendered by a user device. In one example, activation signal may also be transmitted to the user device for rendering the second set of visual indicators to indicate occurrence of the smoke detection event. In one example, the user device may be a portable user device. For example, the user device may be a mobile phone, such as the mobile phone 204-1. The user may thus be able to receive the visual indicators even when the user is not present within the premises, as exemplarily illustrated in FIG. 3D. Limitations associated with the conventional solutions in informing the user about occurrence of the event, when the user is not present within the premises, may be eliminated.

The above exemplary method 700 has been disclosed with respect to the second alert generating unit and the second set of visual indicators. However, such examples may be of non-limiting nature. Other alert generating units, from among the alert generating units 102, may also be used separately, or along with the second alert generating unit 102-2, for rendering other set of visual indictors, that may be formed from among the one or more visual indictors.

FIG. 8 illustrates the method 800 for managing alerts on occurrence of a voice assistance event, according to an example implementation of the present subject matter. The method 800 continues from the block C of the method 500.

At block 802, the event may be ascertained as the voice assistance event. In one example, the voice assistance event may indicate reception of one or more voice commands from a user, such as the occupant, inside the premises. As the voice data may indicate, in one example, the one or more voice commands, the voice data may be indicative of the voice assistance event. Thus, on determining the sensor data to be the voice data, the event may be ascertained as the voice assistance event.

At block 804, a third set of visual indicators may be identified for rendering by the at least one alert generating unit. In one example, the third set of visual indicators may include a text message obtained by processing the voice data, as discussed above. The text message may be identified, in one example, as the third set of visual indicator. In one example, the third set of visual indicators may also include, in one example, at least one of an image indicating occurrence of the voice assistance event and blinking of an LED. On ascertaining occurrence of the voice assistance event, the third set of visual indicators may be identified for being rendered on the at least one alert generating unit, from the plurality of alert generating units.

At block 806, an activation signal may be generated to trigger the at least one alert generating unit for rendering the third set of visual indicators. In one example, the activation signal may include an instruction indicating the third set of visual indicators to be rendered and an address of at least one alert generating unit 102, from among the alert generating units 102, for rendering the third set of visual indictors. In one example, the activation signal may include address of the at least one alert generating unit 102 that may be associated with one or more other users. The other users may be, for example, staff of a hotel and people associated with emergency services. In one example, the activation signal may include address of a third alert generating unit, such as the third alert generating unit 102-3, for rendering the third set of visual indicators. In one example, the third alert generating unit 102-3 may be a tablet, such as the tablet 102-3, that may be associated with the staff of the hotel or people associated with the emergency services. The other users may thus be able to perceive the voice commands being provided by the occupant.

At block 808, the activation signal may be transmitted to the at least one alert generating unit. In one example, the activation signal may be transmitted to the third alert generating unit 102-3.

At block 810, the third set of visual indicators may be rendered by the at least one alert generating unit. In one example, at least the third alert generating unit 102-3, from among the plurality of alert generating units 102, may initiate rendering of the third set of visual indicators in response to receiving the activation signal. In one example, the third alert generating unit 102-3 may initiate rendering of the text message obtained by processing of the voice data. In one example, the third alert generating unit 102-3 may initiate rendering of at least one of the image indicating occurrence of the voice assistance event and blinking of the LED.

At block 812, the third set of visual indicators may also be rendered by a user device. In one example, activation signal may also be transmitted to the user device for rendering the third set of visual indicators to indicate occurrence of the voice assistance event. In one example, the user device may be a portable user device associated with another user, such as another occupant. The other occupant may thus be able to receive the text message, obtained from the occupant's voice message. The other occupant may then take an appropriate action. In one example, the other occupant may receive "help" as the text message on the other occupant's user device from the occupant. The other occupant may then try to contact the occupant from whom the text message was received.

The above exemplary method 800 has been disclosed with respect to the third alert generating unit and the third set of visual indicators. However, such examples may be of non-limiting nature. Other alert generating units, from among the alert generating units 102, may also be used separately, or along with the third alert generating unit 102-3, for rendering other set of visual indictors, that may be formed from among the one or more visual indictors.

Figure 9:
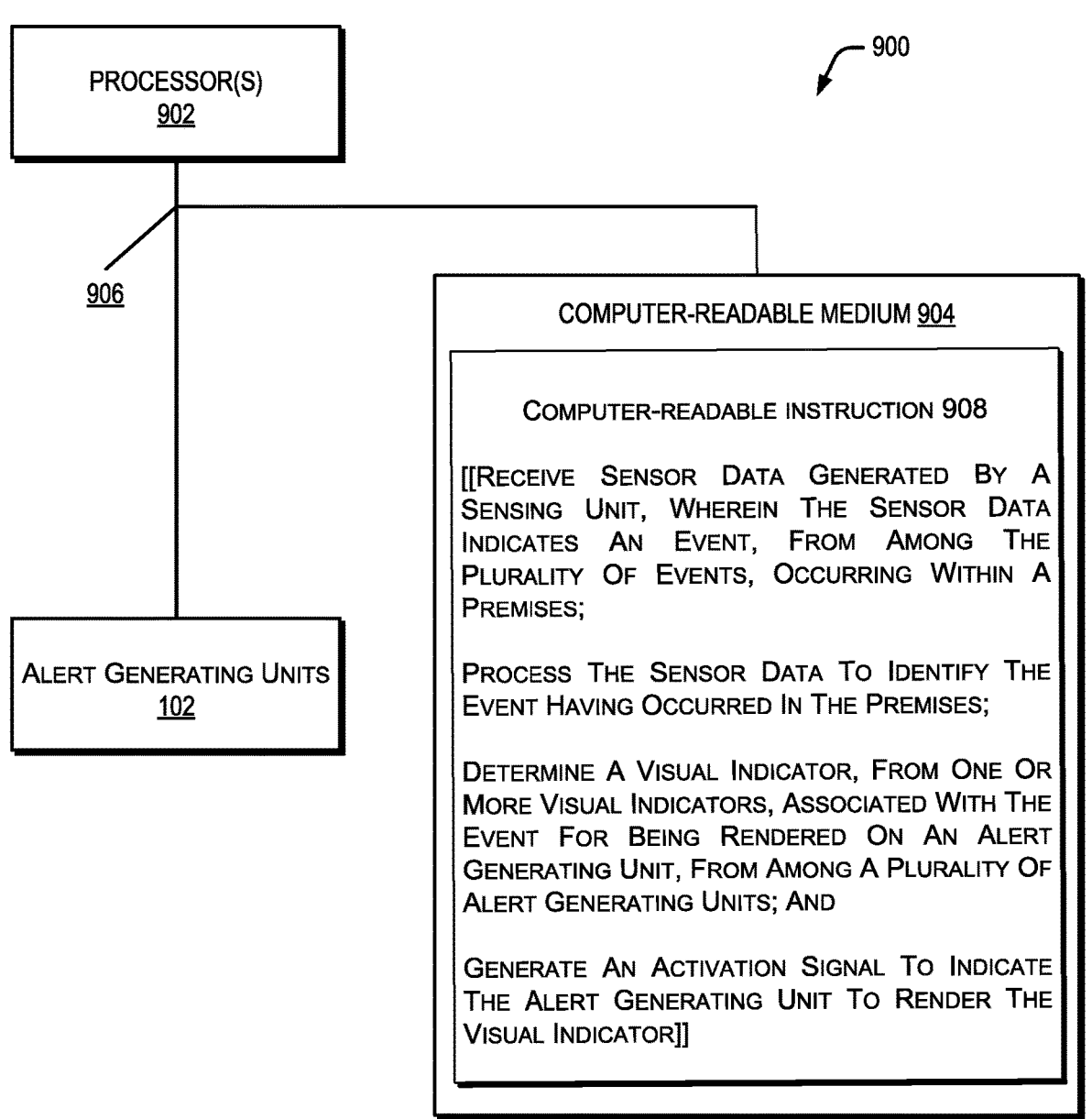
FIG. 9 illustrates a computing environment implementing a non-transitory computer readable medium for managing triggering of alerts on occurrence of different events within a premises, according to an example implementation of the present subject matter.

FIG. 9 illustrates a computing environment 900 implementing a non-transitory computer readable medium for managing triggering of alerts on occurrence of different events within a premises, according to an example implementation of the present subject matter. In an example, the computing environment 900 includes processor(s) 902 communicatively coupled to a non-transitory computer readable medium 904 through a communication link 906. In an example implementation, the computing environment 900 may be for example, the computing environment 200. In an example, the processor(s) 902 may have one or more processing resources for fetching and executing computer-readable instructions from the non-transitory computer readable medium 904. The processor(s) 902 and the non-transitory computer readable medium 904 may be implemented, for example, in the control unit 104 (as has been described in conjunction with the preceding figures).

The non-transitory computer readable medium 904 may be, for example, an internal memory device or an external memory device. In an example implementation, the communication link 906 may be a network communication link. The processor(s) 902 and the non-transitory computer readable medium 904 may also be communicatively coupled to a plurality of alert generating units 102 over the network communication link 906.

In an example implementation, the non-transitory computer readable medium 904 may include a set of computer readable instructions 908 which may be accessed by the processor(s) 902 through the communication link 906. Referring to FIG. 9, in an example, the non-transitory computer readable medium 904 may include instructions 908 that may cause the processor(s) 902 to receive sensor data generated by a sensing unit, such as the sensing unit 202. As described previously, the sensing unit 202 may include sensor(s), such as the sensor(s) 226, located at multiple locations in a premises to sense a plurality of events occurring within the premises. In one example, the sensor(s) 226 may include at least one of a vibration sensor, a smoke detector, and a microphone.

As described previously in an example, the sensor(s) 226 may generate the sensor data indicating occurrence of the event. For instance, the vibration sensor may sense, at least one of, reception of a push on a door located within the premises, one or more knocks on the door, and ringing of a doorbell associated with the door. The vibration sensor may thus generate data, such as the vibration data, indicating such interactions with the door. The vibration data may thus be indicative of a door interaction event, such as the door interaction event previously described. Similarly, the smoke detector may generate data, such as the smoke data, indicating presence of smoke within the premises. The smoke data may thus be indicative a smoke detection event, such as the smoke detection event previously described. Further, the microphone may generate data, such as the voice data, indicating reception of one or more voice commands from a user, such as an occupant within the premises. The voice data may thus be indicative a voice assistance event, such as the voice assistance event previously described.

Further, the sensing unit 202 and the the processor(s) 902 may be communicably coupled through the communication link 906. In one example, the communication link 906 may be similar to the communication network 206, as described in conjunction with the preceding figures. Therefore, the instructions 908 may cause the processor(s) 902 to receive the sensor data from the sensing unit 202 through the communication link 906.

The instructions 908 may further cause the processor(s) 902, in one example, to process the sensor data. In one example, the sensor data may be processed to identify the event, from among the plurality of events, having occurred in the premises. In one example, the identification may be performed based on a determination whether the sensor data is one of the vibration data, the smoke data, and the voice data, as described previously. If the sensor data is ascertained to be the vibration data, the door interaction event may be identified as the event occurred within the premises. However, if the sensor data is ascertained to be the smoke data, the smoke detection event may be identified as the event occurred within the premises.

Further, if the sensor data is ascertained to be the voice data, the voice assistance event may be identified as the event occurred within the premises.

In one example, the instructions 908 may further cause the processor(s) 902 to determine a visual indicator, from one or more virtual indicators, associated with the event for being rendered on an alert generating unit, from among a plurality of alert generating units. The one or more virtual indicators may include graphical indicators, for example, text messages, symbolic alerts, one or more images, blinking of an LED, changing color of light being emitted by the LED, and changing blinking pattern of the LED. In one example, at least one visual indicator, from among the one or more visual indicators, may be associated with at least one event. For example, a first visual indicator, say the symbolic alert, may be associated with the door interaction event; a second visual indicator, say blinking of the LED, may be associated with the smoke detection event; and a third visual indicator, say the text message, may be associated with the voice assistance event. The visual indicator associated with the event may thus be determined.

In one example, the instructions 908 may further cause the processor(s) 902 to generate an activation signal to indicate the alert generating unit 102 to render the visual indicator. As described previously, the activation signal may be generated to instruct at least one of the plurality of alert generating unit 102 to initiate rendering of the determined visual indicator. in one example, the activation signal may be a command indicating the visual indicator to be rendered by the alert generating unit 102. The activation signal may be provided to the alert generating unit 102.

On receiving the activation signal, in one example, the alert generating unit 102 may initiate rendering of the visual indicator indicated in the activation signal. For instance, if the activation signal indicates the first visual indicator to be the determined visual indicator, the alert generating unit 102 may initiate rendering of the symbolic alert to indicate occurrence of the associated event, such as the door interaction event.

In one example, the instructions 908 may further cause the processor(s) 902 to identify at least one portable user device, such as the user device(s) 204, for rendering the visual indicator associated with the event. As described previously, the user device(s) 204 that may be communicably coupled with the control unit 104 may be identified for rendering the visual indicator. In one example, the user device(s) 204 may be communicably coupled with the control unit 104 using a user application, such as the user application described in preceding figures.

The activation signal may then be sent to the at least one portable user device for rendering the visual indicator. In one example, the portable user device may be a mobile phone, such as the mobile phone 204-1, associated with the occupant. On receiving the activation signal, the portable user device may initiate rendering of the visual indicator indicated by the activation signal to indicate occurrence of the associated event to the occupant.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A system comprising:
a plurality of alert generating units to render one or more visual indicators, wherein each of the one or more visual indicators is associated with at least one event from among a plurality of events, and wherein each visual indicator is to indicate occurrence of the associated at least one event within a premises; and
a control unit communicably coupled with a sensing unit located within the premises and the plurality of alert generating units, wherein the control unit is configured to:
receive sensor data generated by the sensing unit;
process the sensor data to ascertain occurrence, within the premises, of an event from among the plurality of events;
analyze the sensor data to classify the sensor data into one of a plurality of predefined event types corresponding to a plurality of physical occurrences within the premises;
identify an event-specific set of visual indicators corresponding to a classified event, from among the one or more visual indicators, for being rendered on at least one alert generating unit, from among the plurality of alert generating units, wherein the at least one alert generating unit is selected from among the plurality of alert generating units based on a severity of the classified event and a determination that a user and the at least one alert generating unit are within the premises in which the classified event is ascertained;
in response to detection of at least one of (i) a change in the severity of the classified event and (ii) occurrence of a first event within the premises, dynamically modify at least one visual indicator being rendered by the selected at least one alert generating unit; and
transmit an activation signal to the at least one alert generating unit for rendering the event-specific set of visual indicators.

2. The system of claim 1, wherein each of the plurality of alert generating units comprises at least one of:
a communication module to communicate with the control unit, wherein the communication module is to receive the activation signal generated by the control unit;
one or more indication devices to render the set of visual indicators, the one or more indication devices comprising at least one of:
a display device; and
a Light Emitting Diode (LED) device; and
a processor to:
receive the activation signal from the communication module; and based on the activation signal, control operation of the indication device to render the set of visual indicators associated with the event.

3. The system of claim 1, wherein the plurality of events comprises at least one of:

a door interaction event comprising at least one of:

receiving one or more knocks on a door of a room located within the premises; and ringing of a doorbell associated with the door;

a smoke detection event; and a voice assistance event comprising receiving a voice command from the user located within the premises.

4. The system of claim 3, wherein the sensor data comprises at least one of vibration data, smoke data, and voice data.

5. The system of claim 4, wherein the sensing unit comprises at least one of:

a vibration sensor to generate the vibration data indicating at least one of:

reception of one or more knocks on the door; and ringing of the doorbell;

a smoke detector to generate the smoke data indicating detection of smoke inside the premises; and a microphone to generate the voice data indicating reception of the voice command from the user.

6. The system of claim 5, wherein the control unit further is to:

determine if the sensor data is one of the vibration data, the smoke data, and the voice data;

upon determining the sensor data to be the vibration data, ascertain occurrence of the door interaction event within the premises;

identify a first set of visual indicators associated with the door interaction event, as the set of visual indicators, for being rendered on the at least one alert generating unit; and generate the activation signal to trigger the at least one alert generating unit to render the first set of visual indicators on a corresponding indication device of the at least one alert generating unit.

7. The system of claim 5, wherein the control unit further is to:

determine if the sensor data is one of the vibration data, the smoke data, and the voice data; upon determining the sensor data to be the smoke data, ascertain occurrence of the smoke detection event;

identify a second set of visual indicators associated with the smoke detection event, as the set of visual indicators, for being rendered on the at least one alert generating unit; and generate the activation signal to trigger the at least one alert generating unit to render the second set of visual indicators on a corresponding indication device of the at least one alert generating unit.

8. The system of claim 5, wherein to ascertain occurrence of the voice assistance event, the control unit is to:

process the voice data to obtain machine understandable data;

ascertain occurrence of the voice assistance event based on the machine understandable data; convert the machine understandable data into a text message;

identify the text message as a third set of visual indicators for being rendered on the at least one alert generating unit; and generate the activation signal to render the third set of visual indicators on a corresponding indication device of the at least one alert generating unit.

9. The system of claim 1, wherein the control unit further is to:

identify at least one user device communicably coupled with the control unit; and send the activation signal to the at least one user device to render the set of visual indicators associated with the event.

* * * * *